(12) United States Patent
Jujjuri

(10) Patent No.: US 12,450,211 B2
(45) Date of Patent: Oct. 21, 2025

(54) DATABASE REQUEST HANDLING DURING DATA MIGRATION BETWEEN PHYSICAL NODES

(71) Applicant: Salesforce, Inc., San Francisco, CA (US)

(72) Inventor: Venkateswararao Jujjuri, Beaverton, OR (US)

(73) Assignee: Salesforce, Inc., San Francisco, CA (US)

( * ) Notice: Subject to any disclaimer, the term of this patent is extended or adjusted under 35 U.S.C. 154(b) by 25 days.

(21) Appl. No.: 18/427,375

(22) Filed: Jan. 30, 2024

(65) Prior Publication Data

US 2025/0245207 A1  Jul. 31, 2025

(51) Int. Cl.
  *G06F 16/21* (2019.01)
  *G06F 16/27* (2019.01)
(52) U.S. Cl.
  CPC ............ *G06F 16/214* (2019.01); *G06F 16/27* (2019.01)
(58) Field of Classification Search
  None
  See application file for complete search history.

(56) References Cited

U.S. PATENT DOCUMENTS

| 10,158,642 | B2 | 12/2018 | Jujjuri |
| 10,713,223 | B2 | 7/2020 | Jujjuri |
| 11,016,990 | B2 | 5/2021 | Wyatt |
| 11,347,774 | B2 | 5/2022 | Jujjuri |
| 11,509,721 | B2 | 11/2022 | Ghatage |
| 2018/0329605 | A1 | 11/2018 | Venkateswararao |
| 2020/0274923 | A1 | 8/2020 | Jujjuri |
| 2021/0191910 | A1* | 6/2021 | Govindaraj ........... G06F 16/119 |
| 2022/0019366 | A1* | 1/2022 | Freilich ............... G06F 21/6218 |
| 2022/0245092 | A1 | 8/2022 | Jujjuri |
| 2022/0245094 | A1 | 8/2022 | Jujjuri |
| 2022/0247812 | A1 | 8/2022 | Mehta |
| 2022/0247816 | A1* | 8/2022 | Ghatage ................ G06F 16/953 |
| 2023/0147295 | A1 | 5/2023 | Guttapalem |
| 2023/0297685 | A1* | 9/2023 | Patil ...................... G06F 21/577 726/27 |

* cited by examiner

*Primary Examiner* — Joshua Bullock
(74) *Attorney, Agent, or Firm* — Kowert, Hood, Munyon, Rankin & Goetzel, P.C.; Dean M. Munyon

(57) ABSTRACT

Techniques are disclosed relating to migrating database extents between physical storage nodes. A database system stores current and new assignment metadata mapping virtual groupings of database extents physical storage nodes, the new assignment metadata reflecting a data migration of extents between the plurality of physical storage nodes. During the migration, the database system receives 1) read requests, which it responds to by reading data from a first physical storage node identified using the current assignment metadata and 2) write requests, which it responds to by writing data to a second physical storage node identified using the new assignment metadata. Upon the migration being complete, the system identifies physical storage nodes accessed by subsequent read and write requests using the new assignment metadata.

20 Claims, 13 Drawing Sheets

| Ext. ID | Hash(Ext ID) |
|---|---|
| A | 1 |
| B | 4 |
| C | 3 |
| D | 2 |
| ⋮ | ⋮ |

| Ext. ID | Hash(Ext ID\|AZ1) |
|---|---|
| A | 4 |
| B | 1 |
| C | 2 |
| D | 3 |
| ⋮ | ⋮ |

(AZ1)

| Ext. ID | Hash(Ext ID\|AZ2) |
|---|---|
| A | 4 |
| B | 3 |
| C | 1 |
| D | 2 |
| ⋮ | ⋮ |

(AZ2)

| Ext. ID | Hash(Ext ID\|AZ3) |
|---|---|
| A | 1 |
| B | 2 |
| C | 3 |
| D | 4 |
| ⋮ | ⋮ |

| Ext. ID | Hash1(Ext ID) |
|---|---|
| A | 1 |
| B | 4 |
| C | 3 |
| D | 2 |
| ⋮ | ⋮ |

(AZ1)

| Ext. ID | Hash2(Ext ID) |
|---|---|
| A | 1 |
| B | 3 |
| C | 2 |
| D | 4 |
| ⋮ | ⋮ |

(AZ2)

| Ext. ID | Hash3(Ext ID) |
|---|---|
| A | 4 |
| B | 2 |
| C | 1 |
| D | 3 |
| ⋮ | ⋮ |

DATABASE REQUEST HANDLING DURING DATA MIGRATION BETWEEN PHYSICAL NODES

CROSS REFERENCE TO RELATED APPLICATIONS

This application is related to the following U.S. application filed concurrently with the present application: U.S. application Ser. No. 18/427,339 entitled "Scalable Mapping for Database Extent Storage on Physical Nodes". This application is hereby incorporated by reference as if entirely set forth herein.

BACKGROUND

Technical Field

This disclosure relates generally to database systems, and, more specifically, to various mechanisms for database extent storage and retrieval.

Description of the Related Art

Enterprises routinely implement database management systems (or, simply "database systems") that enable users to store a collection of information in an organized manner that can be efficiently accessed and manipulated. Within these systems, data is stored in units known as extents. Extents represent a contiguous set of data blocks allocated for a specific database object, such as a table or index.

Accordingly, a database system can store, manage, and access the database objects (e.g., tables) in the database using these database extents. When a database object such as a table or an index is created, the system allocates extents to accommodate the created objects, and then stores the extents. The database system also stores metadata describing the extents (such as their locations). When querying or manipulating data, the database system will use the metadata in referencing the extents.

BRIEF DESCRIPTION OF THE DRAWINGS

FIG. 5A is a table illustrating example extent-to-virtual group assignments using the same hashing operation for different availability zones.

FIGS. 5B-C are tables illustrating example extent-to-virtual group assignments using different hashing operations for different availability zones.

DETAILED DESCRIPTION

Figure 1A:
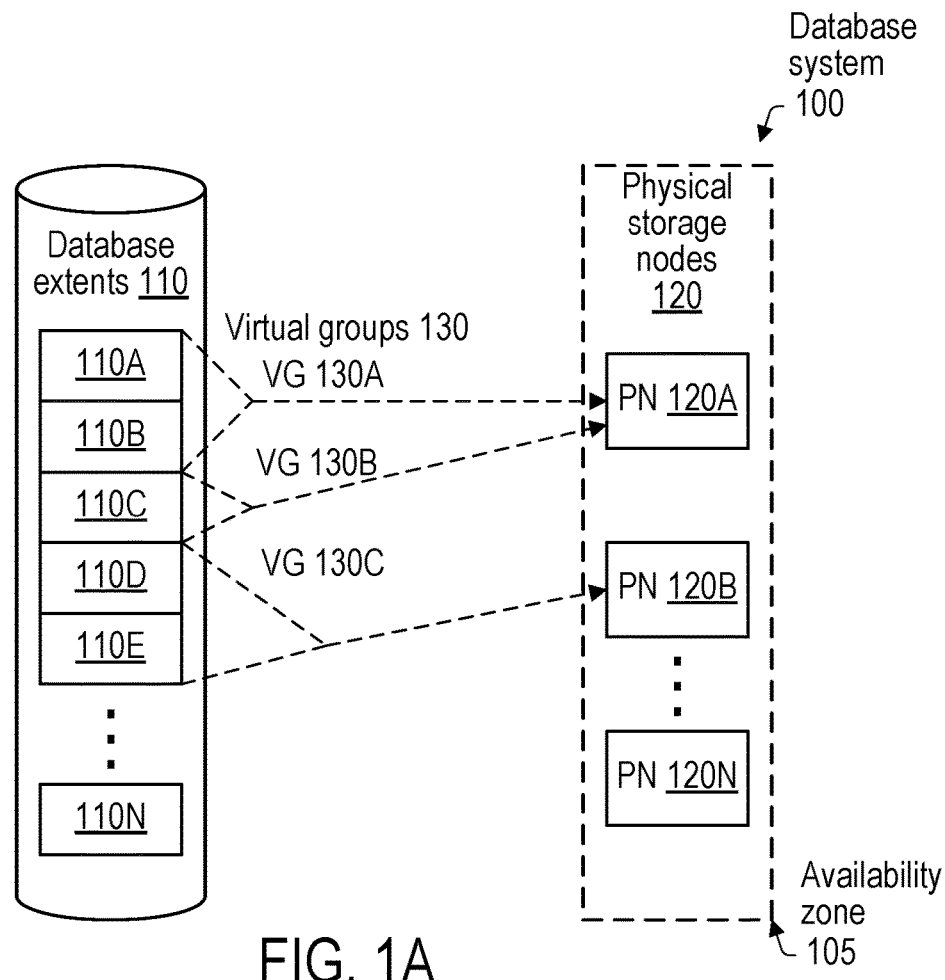
FIG. 1A is a block diagram of an example assignment of extents to physical storage nodes using virtual groups of extents.

Database systems rely on database storage to manage and retrieve structured information from a database to support tasks such as user authentication, data processing, content delivery, and real-time information access. In many cases, data in database storage is stored in the form of database extents. Frequently, a database engine (also referred to herein as a "database server" or a "database node") of a database system manages and accesses database extents by storing and reading/writing them in durable storage. Durable storage, as used herein, refers to a storage system that is intended for the long-term storage of data, particularly one that can survive power outages and catastrophic events (e.g., AMAZON S3 within AMAZON WEB SERVICES (AWS) and datacenters are examples of durable storage). In those cases, when receiving a particular query specifying a particular object, a database system determines the object's extent, and accordingly accesses the specific durable storage hosting the determined extent to retrieve the specified object.

In many cases, a database system directly accessing extents in durable storage may have a higher access latency relative to accessing data using other storage services. This may be caused by hardware limitations of durable storage, which commonly have higher access latency than other types of storage technology. This increase in latency may cause issues for certain applications, however.

To reduce the issue of access latency, the present disclosure proposes a system in which a set of physical storage nodes (also referred to as physical nodes, or PNs) are used collectively to act as a cache between the database extents stored in persistent storage and the database engine accessing the database extent on behalf of database clients. A physical storage node can cache an extent from durable storage (or another entity storing the extent) and service traffic from database engines requesting the extent by returning the cached extent. Since physical storage nodes are typically equipped with highly performant storage devices (e.g., NVMe SSDs), which, though ephemeral, have lower access latency than those used by durable storage (e.g., HDDs), a caching service implemented by the physical storage nodes will have lower access latency than durable storage.

One advantage of durable storage is that it is highly scalable. The present disclosure recognizes that it is desirable to make the proposed caching service or layer as scalable as durable storage, so that as durable storage grows, so does the caching layer. Thus, in addition to reducing extent access latency, the present disclosure discloses a paradigm that also allows for scalability of the system. Notably, this paradigm supports the addition/removal of physical storage nodes (and subsequent operations) without causing downtime for entities accessing the physical storage nodes.

This proposed paradigm achieves this scalability in part by using a new mapping model. As will be described, extents may be grouped into "virtual groups" (VGs) of extents that can be reassigned to other physical storage nodes when the number of PNs changes. (As will be described, PNs may need to be added, deleted, or rebalanced, etc.) Under this mapping, extents are grouped into VGs, where each virtual group is assigned to a particular physical storage node, and the extents within the virtual group are cached at the physical storage node from durable storage. Thus, when a physical storage node is to be added or removed, the associated virtual groups can be reassigned to other physical nodes, which will, after data migration (or just "migration," which includes the migration of extents both individually and as part of virtual groups), now cache the extents previously cached in their original physical storage nodes. This paradigm allows for the dynamic increase or decrease of the number of PNs without having to individually manage/reassign all of the extents being migrated individually.

In some cases, migrating extents due to changes in assignments may make these extents temporarily unavailable to the database engines accessing them. To reduce this access downtime, the present disclosure additionally proposes that PNs may store a copy of the assignment metadata before the change (a "current" copy), and a copy of assignment metadata after the change (a "new" copy). The database engine can then use either the current or new metadata based on, among other criteria, whether the request is a read or a write. In this manner, the physical storage node can continue to service read and writes with no downtime during a data migration, despite its change in assigned VGs.

Turning now to FIG. 1A, a block diagram of an example assignment of extents to physical storage nodes using virtual groups of extents is shown. As depicted, a database system 100 includes extents 110 that are grouped in virtual groups 130, which in turn are assigned to physical storage nodes 120 assigned to physical storage nodes 120. As used herein, the term "physical node" refers to computing resources located on a computer system such as a cloud computing environment (e.g., AWS). A physical node may be an actual physical machine or a virtual machine (VM) and the resources allocated to it on a physical machine. A physical node may use AMAZON Machine Images (AMI) in some embodiments. An AMAZON EC2 instance is one example of a physical node. A "physical" node is thus distinguished from a virtual node or virtual grouping of physical nodes that will be described later. A "physical storage node" refers to a physical node that is used for storage purposes, such as to implement a cache, although reference to a "storage node" is not intended to imply that the node cannot have other capabilities, such as for compute power. Physical storage nodes are described herein as implementing a scalable caching layer for durable storage. Although extents 110 are depicted as contiguously stored in one physical location in FIG. 1A, they may be distributed in more than one physical location, as will be discussed in more detail with respect to FIG. 2.

System 100, in various embodiments, implements a platform service (e.g., a customer relationship management (CRM) platform service) that allows users of that service to develop, run, and manage applications. System 100 may be a multi-tenant system that provides various functionality to users/tenants hosted by the multi-tenant system. Accordingly, system 100 may execute software routines from various, different users (e.g., providers and tenants of system 100) as well as provide code, web pages, and other data to users, databases (e.g., with extents 110), and other entities of system 100. In various embodiments, system 100 is implemented using a cloud infrastructure that is provided by a cloud provider. Physical nodes 120 may thus execute on and utilize the available cloud resources of that cloud infrastructure (e.g., computing resources, storage resources, network resources, etc.) to facilitate their operation. For example, the components of physical node may execute in a virtual environment that is hosted on server-based hardware included within a data center of the cloud provider. But in some embodiments, system 100 is implemented utilizing a local or private infrastructure as opposed to a public cloud.

As depicted, each virtual group (VG) 130 includes a number of extents 110 and is assigned to a physical node 120. For example, VG130A includes extents 110A-B, VG 130B includes extent 110C, and VG 130C includes extents 110D-E. VGs 130A-B are assigned to physical storage node 120A, while VG 130C is assigned to node 120B. Note that VGs—as the term "virtual" and the depiction in dashed lines indicate—do not actually store any data per se. Instead, VGs are metadata grouping multiple extents (e.g., using each extent's respective identifier) as a single collection, enabling the performing of operations on multiple extents at once.

The use of virtual groups advantageously allows the migration of multiple groups of extents simultaneously during a change in the assignments of VGs to PNs. For example, if extents were directly assigned to PNs, extents would have to be migrated individually. For example, migrating extents 110A-C from PN 120A to PN 120N would require three individual extent migration operations. On the other hand, data migration using VGs 130A-B (that, by definition, includes extents 110A-C) would require two operations instead of the three previously described. Note that the example described herein is just one illustration. In practice, a given VG may include many thousands or millions of extents, thus saving overhead that is multiple orders of magnitude larger than shown. Said differently, using a VG to process extents (such migrating extents from one PN to another) requires less database system overhead (e.g., fewer operations, less metadata) than the individual migrating of extents. For example, individually migrating each extent would require the system to store metadata about the status of each extent being migrated, process routines and function calls for each individual extent migration, perform verification (e.g., MD5 sum) of each individual extent, etc.

The physical storage nodes of FIG. 1A are located in what is known as an availability zone (AZ) 105, which, as used herein, refers to one or more discrete data centers, each with redundant power, networking, and connectivity, that are operated in a cohesive fashion; in particular, AZs are managed independently of other AZs which may be located in other geographic regions. In some embodiments, database system 100 stores multiple separate replicas of extents 110 in different availability zones. In this manner, there are multiple availability zones that are similar to AZ 105 with their own PNs that also cache replicas of extents 110.

In some embodiments, virtual groups 130 (and consequently, extents 110) may be reassigned to a different physical node 120. For example, if physical node 120A were to be removed, then VGs 130A-N would be reassigned to other physical nodes. The use of VGs advantageously allows for the redistribution of data at the granularity of multiple extents. VG-to-PN reassignment and subsequent data migration are respectively described in more detail in FIGS. 6-9.

Figure 1B:
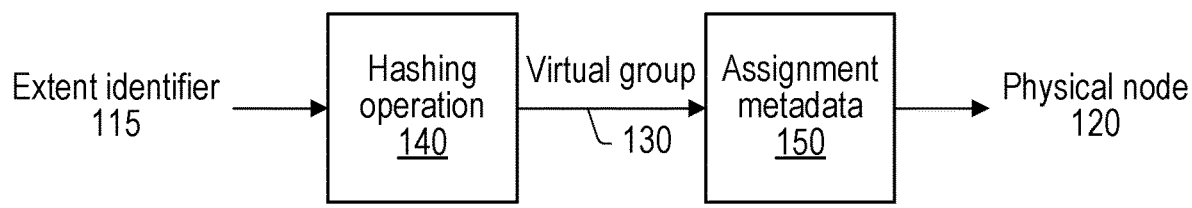
FIG. 1B is a block diagram of operations for mapping an extent to a physical storage node.

Turning now to FIG. 1B, a block diagram of operations for mapping an extent to a physical storage node is shown. As will be discussed, these mapping operations enable various database transactions to be completed in the database system. These mapping operations thus facilitate the creation and storing data in new extents, the retrieval of data in existing extents, the migration of extents from one physical node to another, etc.

As shown, database extents 110 are mapped to virtual groups using hashing operation 140. One example of hashing operation 140 is a hash function that receives a database extent identifier 115 (also referred to as "extent ID" or "ext ID") and outputs a hash value that is then mapped to a corresponding virtual group (e.g., by locating a bucket representing the virtual group). In some embodiments, hashing operation 140 may differ based on the availability zone that physical storage nodes 120 are hosted in, as will be discussed in more detail with respect to FIGS. 5A-B.

Assignment metadata 150 includes metadata mapping virtual groups 130 to physical storage nodes 120. Various operations that create assignment metadata 150 are contemplated. In one example, precomputed assignment tables are used to distribute virtual groups 130 to physical nodes 120. One set of precomputed tables may be used depending on the number of physical nodes 120 (e.g., a first precomputed assignment table for when there are two PNs, a second precomputed assignment table for when there are three PNs, etc.). In another example, virtual groups 130 are assigned to physical nodes 120 in round-robin fashion. In yet another example, virtual groups are 130 are assigned to physical nodes 120 using a hashing operation (separate from hashing operation 140) that hashes virtual groups into respective physical nodes. As will be described in more detail with respect to FIGS. 6A-C and 7B, assignment metadata 150 may change based on the change in the number of available physical nodes 120, which advantageously enables the scalability of the system.

Accordingly, hashing operation 140 and assignment metadata 150 may be used to determine an extent's corresponding physical node throughout the extent's lifecycle. When an extent is created, an extent ID is generated (e.g., using a random number generator, a counter, etc.), the extent ID is mapped to a virtual group 130 using hashing operation 140, and assignment metadata 150 determines which physical node 120 will cache the newly created extent. When the extent is to be accessed (e.g., read, write, delete, etc.), the extent ID may be hashed using operation 140 to VG 130, which is in turn used to lookup corresponding PN 120.

Figure 2:
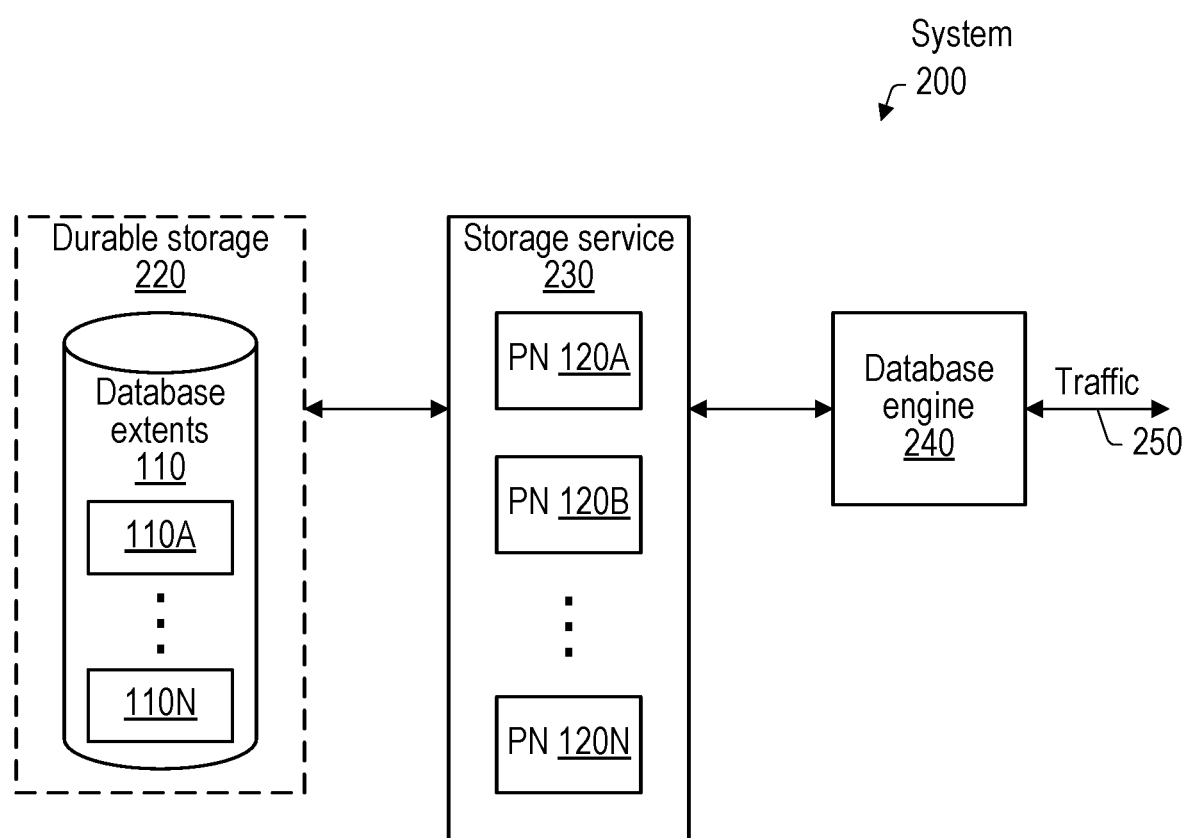
FIG. 2 is a block diagram of one embodiment of a database system that implements extent storage in physical nodes.

Turning now to FIG. 2, a block diagram of a database system 200 that implements extent storage in physical nodes is shown. System 200 includes a set of components that may be implemented via hardware or a combination of hardware and software routines. In the illustrated embodiment, system 200 comprises durable storage 220, storage service 230, and database engine 240. As shown, durable storage 220 stores extents 110A-N, storage service 230 hosts physical storage nodes 120, and database engine 240 services traffic 250. In some embodiments, system 200 is implemented differently than shown. For example, database engine 240 may itself also include an in-memory cache for extents 110.

Durable storage 220, in various embodiments, stores extents 110. As indicated by the dashed lines, durable storage 220 is implemented using a single or multiple storage devices that are connected together on a network (e.g., a storage attached network (SAN)) and configured to redundantly store information in order to prevent data loss. The storage devices may store data persistently and thus durable storage 220 may serve as a persistent storage for system 200. In various embodiments, data written to extents 110 by storage service 230 in one particular availability zone may be available to a storage service in another availability zone. In one embodiment of system 200, each physical node 120 is assigned a different instance of durable storage 220.

Storage service 230, in various embodiments, hosts physical nodes 120. Storage service 230 may be on the same platform as durable storage 220, or on a different platform. In some embodiments, storage service 230 as shown represents the storage service 230 in one availability zone, but storage service 230 may host PNs 120 in multiple availability zones, as will be discussed in more detail with respect to FIG. 3. In some embodiments, storage service 230 is a container service that provides low-latency storage and computing resources (e.g., a combination of software and hardware optimized for low latency access). Example storage services include AWS EC2, MICROSOFT AZURE, GOOGLE CLOUD, etc. Thus, while service 230 may typically be associated with providing computing resources, its low-latency properties may make it desirable for low-latency storage as well.

Database engine 240, in various embodiments, provides database services, such as data storage, data retrieval, and/or data manipulation. In various embodiments, database engine 240 is software that is executable on hardware, while in some embodiments, it encompasses both the hardware and software. The database services may be provided to components within system 200 and/or external to system 200. For example as mentioned, database engine 240 may send traffic 250 that includes a transaction request for a database application (not shown) to perform a database request (e.g., read, write, etc.) on extents 110. A database transaction, in various embodiments, is a logical unit of work (e.g., a specified set of database operations) to be performed in relation to database system 200. For example, a database transaction may include a SELECT database statement and therefore processing the database transaction may involve database engine 240 querying extents (either in durable storage 220 or physical nodes 120). Database engines in the context of the techniques and methods described herein are discussed in more detail with respect to FIG. 4.

Figure 3:
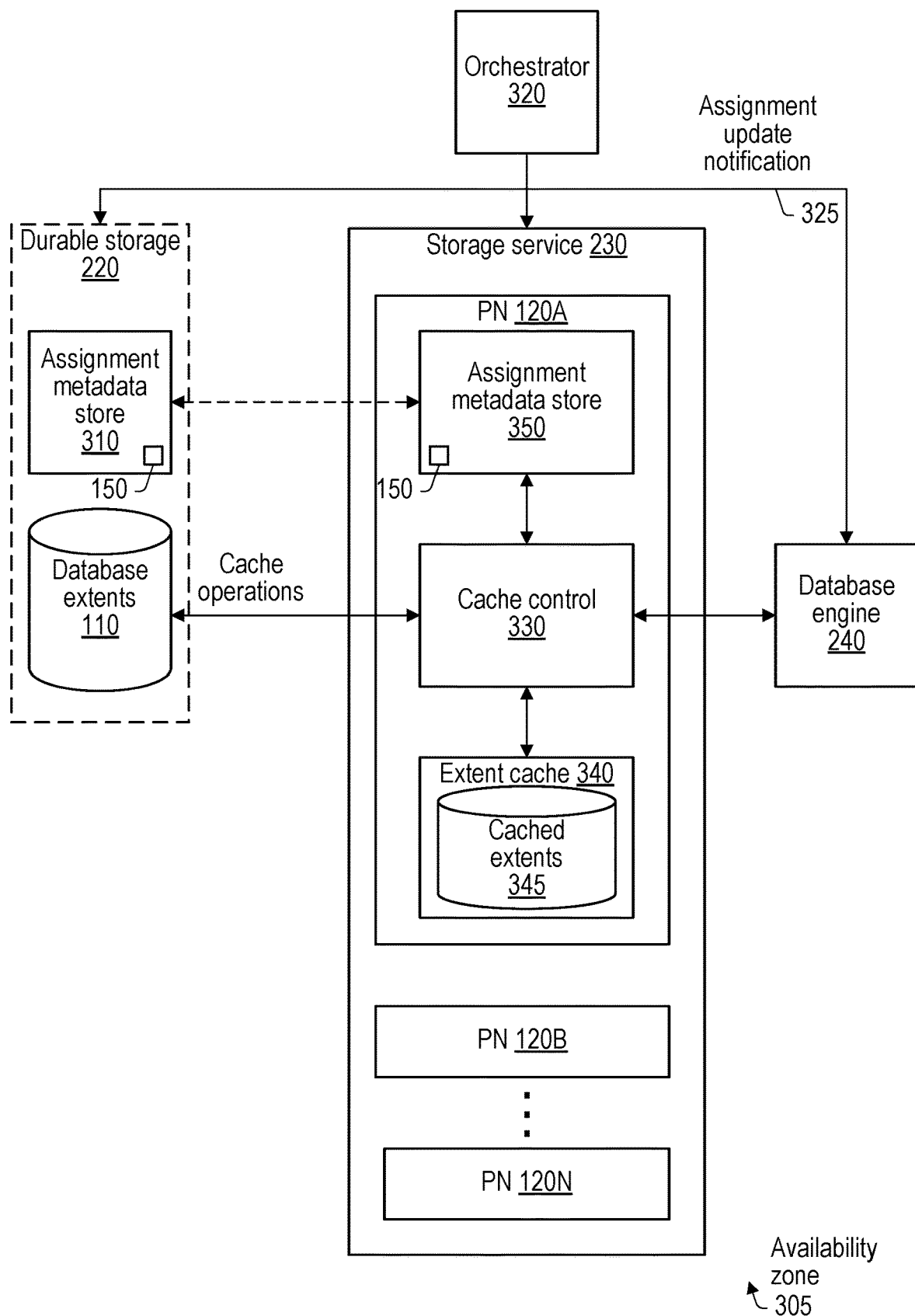
FIG. 3 is a block diagram that shows a more detailed embodiment of database system that includes a physical storage node.
Figure 4:
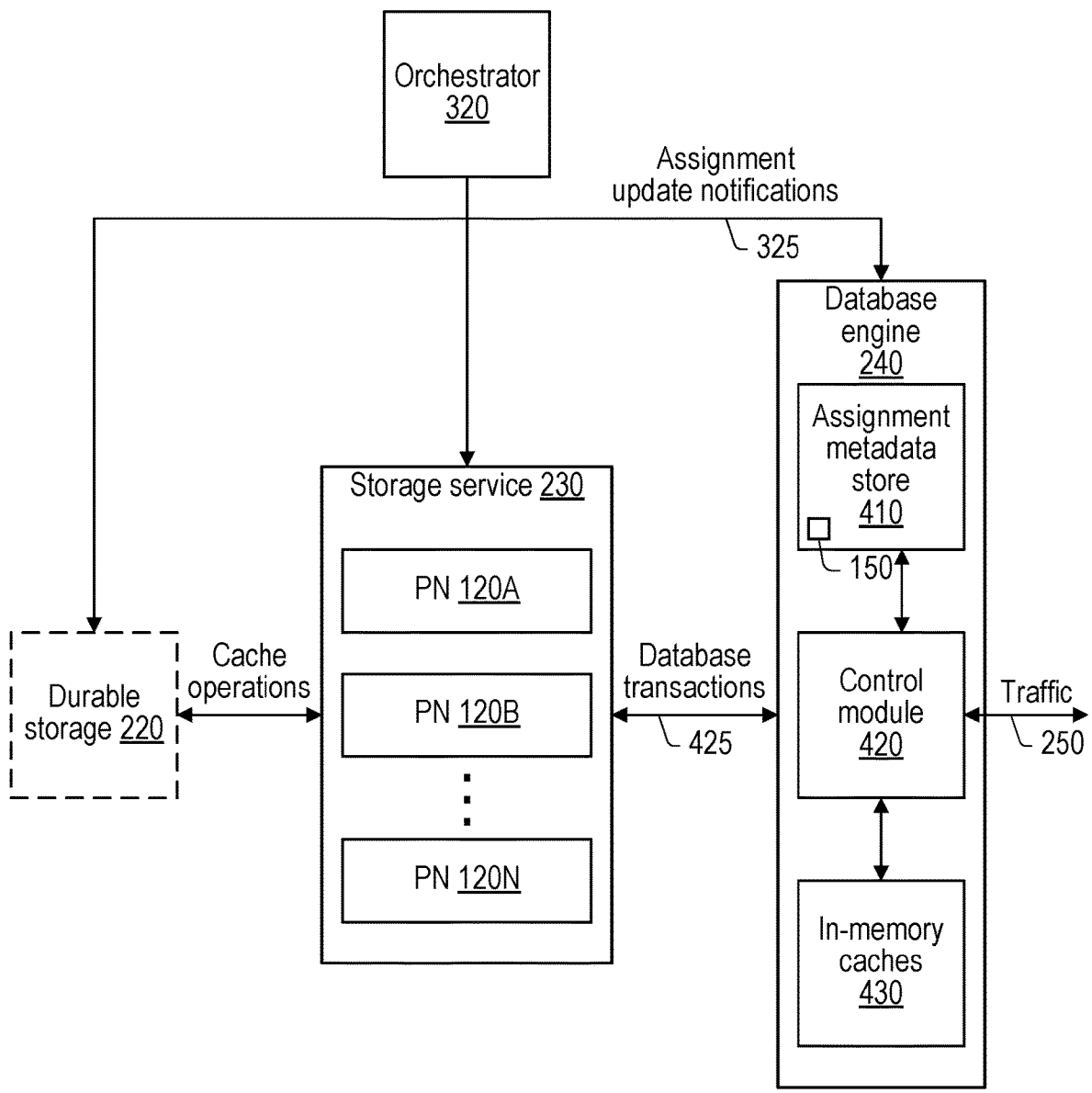
FIG. 4 is a block diagram of one embodiment of a database engine within a database system.

As noted, FIG. 2 is one example implementation of the techniques and methods described in FIGS. 1A-B that enable the storing of extents 110 in physical nodes 120. FIG. 3 will describe a more detailed implementation of extent caching from the point of view of physical node 120A. FIG. 4, on the other hand, will describe a more detailed implementation from the point of view of database engine 240, which retrieves extents from physical nodes 120.

Turning now to FIG. 3, a block diagram of a more detailed embodiment of a database system that includes a physical storage node is shown. In the illustrated embodiment, durable storage 220 includes assignment metadata store 310. PN 120A further includes cache control 330, assignment metadata store 350, and extent cache 340 storing cached extents 345. An orchestrator 320 sends assignment update notifications 325 to durable storage 220, storage service 230, and database engine 240.

As shown, assignment metadata store 310 is storage space in durable storage 220 that includes assignment metadata describing mappings of virtual groups 130 to respective physical nodes 120. In some embodiments, multiple versions of assignment metadata are stored in metadata store 310. For example, metadata store 310 may store assignment metadata before and after a change in node assignments, as will be discussed in more detail with respect to FIG. 8.

Also as shown, assignment metadata store 310 includes a "master copy" of assignment metadata, and any changes to the assignment information is to be reflected in other components such as assignment metadata store 350. For example as indicated by the dashed lines, assignment metadata store 350 is storage in PN 120 that reflects the assignment metadata in store 310 of durable storage 220, both initially when the PN 120 is launched (e.g., by orchestrator 320), and as orchestrator 320 updates assignment metadata, as will be discussed in more detail below.

Cache control 330, in various embodiments, is software executable to perform the various functions for caching and maintaining extents at PN 120A. In particular, cache control 330 causes the storing of extents 110 in extent cache 340. For example, cache control 330 may causes a cache "hydration" operation in which cache control 330 determines, using metadata store 350, all virtual groups 130 (and thus extents 110) that are assigned to PN 120A, and then proceeds to cause the download from durable storage 220 of the determined extents 110 belonging to the assigned virtual groups 130. Once caching is complete, PN 120 is capable of servicing requests to extents 110 by returning corresponding cached extents 345 instead, which may reduce extent retrieval latency. Note that although extent cache 340 is depicted as a component within PN 120A, it may be stored externally to PN 120A in some implementations (e.g., on a separate HBase™ memstore cache that still has lower latency compared to accessing durable storage 220).

Furthermore, a given PN 120A may use cache control 330 to access and service requests from other entities that specify one or more extents 110. In an example read operation, PN 120A receives traffic from database engine 240 that specifies a particular extent. Cache control 330 can then reference the appropriate cached extent 345, access it, and return it to service requests from database engine 240. In some cases in which extent cache 340 does not store the corresponding cache (analogous to a cache miss), cache control 330 may instead directly reference an extent 110 (e.g., using its extent identifier and another piece of assignment metadata) in durable storage 220 and return it to database engine 240.

PN 120A may perform these extent accesses (e.g., for cache hydration, for extent creation, for servicing requests, etc.) using metadata 150 cached in assignment metadata store 350. In one example access, PN 120A determines 1) virtual groupings 130 of database extents 110 that are assigned to itself (i.e., its physical node identifier) and 2) the extents corresponding to the determined virtual grouping (e.g., which were initially hashed to the virtual groupings). Then, PN 120A accesses determined extents 110 from durable storage 220, and stores the accessed extents in extent cache 340. Once PN 120A has completed caching extents of its assigned VGs, it can then service requests (e.g., from database engine 240) using cached extents 345.

Orchestrator 320, in various embodiments, is software executable to perform various high-level database operations that may occur across multiple entities, such as managing the distribution of data across the physical nodes. Thus, orchestrator 320 may change assignment metadata based on, for example, a change in the number PNs and notify elements of system 100 of the change using update notification 325. In one embodiment, orchestrator 320 generates the new assignment information, stores the generated assignment information, and notifies relevant entities of the change in assignment information via assignment update notification 325. For example, if orchestrator 320 determines that there needs to be a change in the PN-to-VG assignments, it may generate new assignment metadata that describes updated assignments and store it in metadata store 310. Then, orchestrator 320 broadcasts assignment update notification 325 to relevant entities of the system (for example, durable storage 220, PNs 120, and database engine 240).

Then, the entities of the database system, in response to assignment update notification 325, may perform operations in accord with a data migration. PNs 120 and engine 240 may, for example, download the newly updated assignment information into their respective metadata stores (e.g., metadata store 350) for local access. Furthermore, as will be described in more detail with respect to FIGS. 7-8, the issuance of assignment update notifications 325 may place the database system in a state that causes it to behave differently with respect to using PNs in database transactions. For example as will be described, reads and writes to extents undergoing migration can be performed differently than those to extents in a stable state.

In some cases, cache control 330 may also write back modified cached extents 345 to extents 110 in durable storage 220. In one example embodiment, cache control 330 writes back modified cached extents 345 to extent 110 (analogously to the writing back of dirty cache lines to memory). In some cases, this write-back is performed in response to assignment update notification 325.

Turning now to FIG. 4, a block diagram that shows a more detailed embodiment of a database system that includes a database engine. As shown, database engine 240 includes assignment metadata store 410, control module 420, in-memory caches 430. Also as shown, engine 240 is executable to send database transactions 425 to PNs 120A-N via control module 420.

Control module 420, in various embodiments, is operable to service traffic 250, which may include read and write requests. In one example embodiment, database engine 240 receives, via control module 420, traffic 250 that includes a request to access an extent with a particular extent identifier (e.g., identifier "A"). In response, control module 420 performs a hashing operation using identifier "A" to determine a particular virtual grouping "VG-A" that includes the particular database extent (for example, virtual grouping "VG-A."). Control module 420 then accesses assignment metadata store 410 to determine which of PNs 120A-N is mapped to "VG-A". Ultimately, database engine 240 accesses an extent of ID "A" in its particular PN 120 to service the request. In some cases, this extent will be stored within extent cache 340 in storage service 230; in other cases, this extent may be stored within in-memory caches 430, which are described next.

In-memory caches 430 are buffers that store data in memory (e.g., random access memory) of database engine 240. HBase™ memstore is one example of an in-memory cache 430. Caches 430 may be located within a shared memory area designated by an operating system executing on database engine 240. In-memory caches 430 may include one or more types of caches that facilitate transactions between engine 240, storage service 230/PNs 120, and durable storage 220.

In one embodiment, caches 430 also stores copies of extents 110 for accessing extents at a lower latency relative to extent accesses at both PNs 120 and durable storage 220. Thus, caches 430 effectively act similar to an L0 extent cache in hardware, making extent cache 340 analogous to an L1 cache, and durable storage 220 analogous to backing memory. In that scenario, control module 420 may perform cache maintenance operations similar to those performed by cache control 330, but for extents in in-memory caches 430.

Note that descriptions of FIGS. 3-4 describe a database system in what can be referred to as a "stable" state in which there is no ongoing data migration, i.e., no change in assignments of virtual groups to physical extents. But engine 240 may also be capable of accessing extent PNs 120 during a data migration (which is referred to as a "non-stable" or "active" state) using modified read/write operations that factor in the data migration, as will be discussed in more detail with respect to FIGS. 7-9.

Multiple AZ-Aware Metadata Storage

Turning now to FIGS. 5A-C, tables illustrating examples of assignment of extents to virtual groups with respect to different availability zones are shown. In FIG. 5A, extents are assigned to the same virtual group in each of the availability zones of the database system. In contrast, FIGS. 5B-C illustrate paradigms in which extents may be assigned to different virtual groups based on the availability zone of the database system by virtue of different hashing operations for the different zones.

As noted, different availability zones may be used to store the same set of database extents using respective sets of physical storage nodes. FIG. 5A depicts such a scenario in which hashing operation 140 (e.g., Hash (Extent ID), where Hash ( ) is SHA, MD5, HMAC, etc.) would cause an extent with a particular extent ID to map to the same VG in all availability zones the database system is operating in. Such a policy of assigning all extents to the same virtual group for all availability zones may pose problems during changes to VG-to-PN assignments, however.

Consider a scenario in which the physical nodes actively used in the database system are collectively tracked in a queue (e.g., a LIFO or a FIFO queue) populated by order of provisioning. In one example, software (e.g., executing on orchestrator 320) that manages the physical nodes stores the list of PN identifiers (PN IDs) as a LIFO queue where the latest-provisioned PN ID is at the head of the queue. In some embodiments, that software is limited to having a single PN ID queue that is identical for all AZs. Thus, in the event of an assignment update, the software would add/remove the same PN ID in all AZs. But if an extent has replicas stored in the PN with the same ID in all AZs, and all extents are in virtual groups that all map to same PN ID (e.g., PN whose ID is at the head/tail of the queue), then all the replicas in all AZs of an extent for a VG affected by a transfer need to be moved across PNs in a given transfer operation. Thus, during the migration, read requests to extents being migrated may have higher latency. Since all extent replicas for an extent are being migrated, they cannot be retrieved with a low-access latency that uses a single version of assignment metadata. Instead, the system will inevitably resort to a higher-latency read that uses both old and new assignment metadata.

But if the VG-to-PN assignments were to be different in each AZ, this issue can be avoided, as a head/tail addition/removal that targets the same PN ID would in that case cause the migration of different extents (as different VGs in each AZ are being migrated despite mapping to the same PN). Thus, the present disclosure proposes assigning extents to different VGs in different availability zones using different hashing operations for each availability zone, so that a given VG is not assigned to the same PN in all three available zones. FIGS. 5B-C illustrate two possible ways of achieving this end. In this manner, a given database extent maps to a different virtual grouping in some or all of the AZs (and thus a different physical node). This prevents the scenario described above and guarantees the availability of at least one extent replica in a given A at any given time (even during a change in the availability of individual PNs).

FIG. 5B depicts extent-to-VG assignments using a hashing function whose input is the extent identifier concatenated with the availability zone identifier, thus creating a different input for the function, and consequently different outputs. For example, Ext. ID B hashes to VG1 in AZ1, to VG3 in AZ2, and VG2 in AZ3. Note that more generally, FIG. 5B illustrates a paradigm in which the value being hashed includes both a database extent ID and an availability zone ID. This disclosure is thus not limited to embodiments in which the extent ID and AZ ID are concatenated, as they may be combined in other ways.

On the other hand, FIG. 5C depicts use of a different hashing function for each availability zone, thus generating different outputs for the same input. For example, Ext. ID B maps to VG4 in AZ1, VG3 in AZ2, and VG2 in AZ3. Note that a combination of FIGS. 5B-C may also be used, with a different hashing function used for each AZ and the use of a hashing input that includes extent ID and AZ ID.

Note that both FIGS. 5B-C may occasionally have extent IDs that map to the same virtual group. But such occurrences will be infrequent at scale. As such, this issue is mitigated by both 1) actual implementations of the system having significantly more than four VGs, which decreases the chances of an extent ID mapping to the same VG, and 2) the presence of more than two availability zones, preventing all copies from the extent being simultaneously affected by a given data migration (in other words, two copies may be affected, but there is always a third copy, which is very unlikely to also be affected). In very rare cases where all replicas of one extent map to the same VG, the failure described above would cause a scenario analogous to a cache miss, and the extent would be retrieved from durable storage 220 instead of physical nodes 120.

Note that the hashing operations depicted in FIGS. 5A-C are not the sole examples of hashing operation 140. For example, a hashing operation may further include a modulus operation to hash the input extent into a particular virtual group. Furthermore, other mapping operations that are not hash-based (e.g., precomputed assignment tables, dynamic assignments performed by an orchestration module, etc.) may be performed to assign extents to VGs.

PN-to-VG Assignment Updates

Figure 6A:
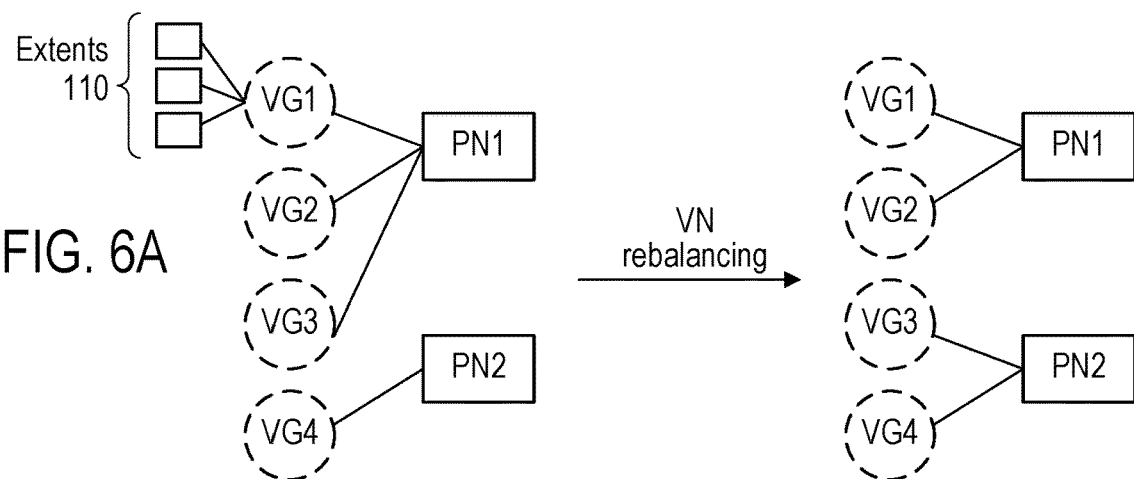
FIGS. 6A-C are block diagrams illustrating different scenarios causing a change in assignment of virtual groups to physical nodes.
Figure 6B:
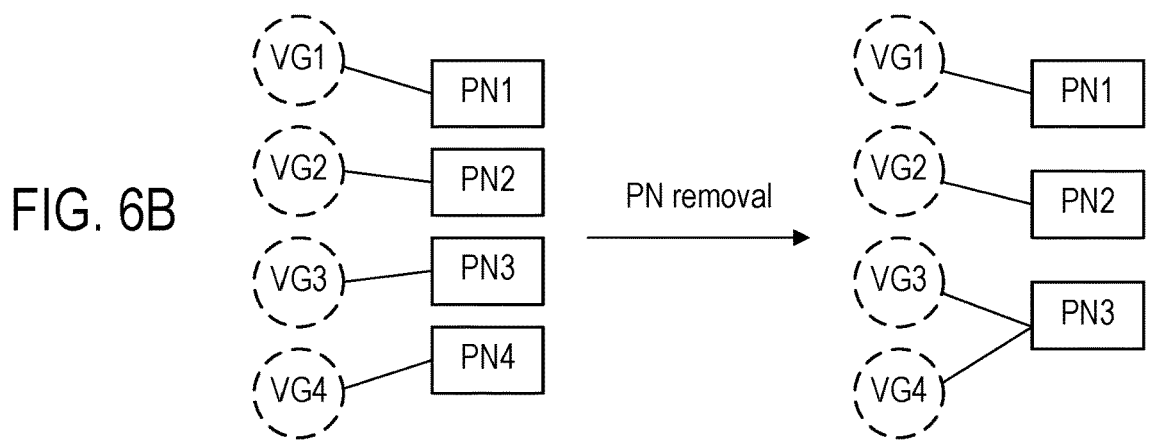
Figure 6C:
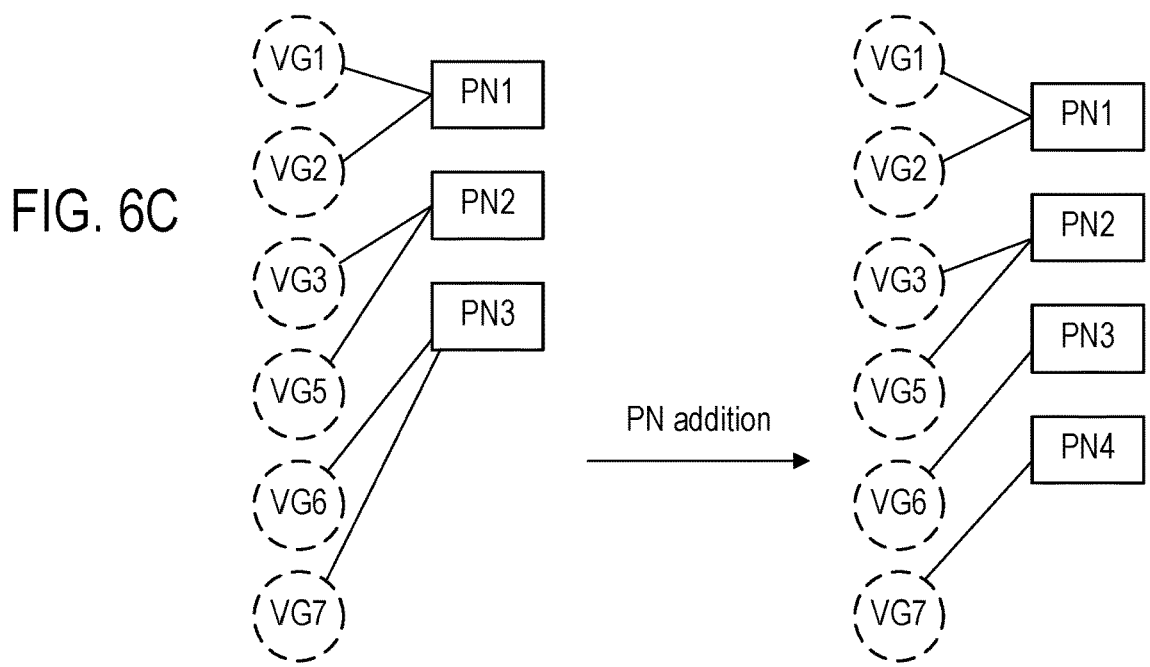

As noted, system 200 may change the assignment of virtual groups to physical nodes. This may be due to needing to scale up caching capacities by adding PNs, scaling down by removing PNs, or rebalancing caches by redistributing VGs to PNs so that every PN has an equal number of VGs assigned to it. FIGS. 6A-C illustrate different scenarios that cause the change in assignment of VGs to PNs.

In some embodiments, orchestrator 320 (not shown) governs the processes of FIGS. 6A-C. Accordingly, orchestrator 320 may detect an imbalance in the numbers of VGs assigned to a PN and determine that a PN needs to be added, determine that a PN needs to be removed, etc. Orchestrator 320, upon the detection, may reassign virtual groups to different physical nodes. This reassignment causes a data migration that involves, among other operations, updating the assignment metadata stores, sending assignment update notifications to storage services, database engines, physical nodes, etc.

FIG. 6A is a block diagram illustrating example VG-to-PN mappings before and after a rebalancing of PNs. In this example, assignment information initially specifies VG1 (to which extents 110 hash), VG2, and VG3 to PN1, and VG4 to PN2. Since the initial distribution of VGs to PNs is unbalanced, the database system may reassign VG3 to PN2 so that PN1 and PN2 are assigned to two VGs each. In some cases, rebalancing may be initiated due to a determination that one or more PNs are assigned a number VGs that is over or under a particular threshold relative to the average number of VGs assigned to other PNs. Note that although only FIG. 6A depicts a VG (VG1) as possessing extents that are hashed to it, it is evident that each VG across FIGS. 6A-C possess its own extents.

FIG. 6B is a block diagram illustrating example VG-to-PN mappings before and after the removal of a PN. In this example, system 200 removes PN4. Since extents of PN4 need to be stored in a different PN so that the system still has the benefit of extent caching, the database system reassigns VG3 from PN4 to PN3, as PN4 is no longer active. In some embodiments, PN removal may be initiated due to a determination that the capacity of a particular PN is no longer needed and can be reassigned to excess capacity of other PNs.

FIG. 6C is a block diagram illustrating example VG-to-PN mappings before and after the addition of a PN. In this example, system 200 adds PN4. Since there are more resources available to store extents (and other data), the database system reassigns VG7 from PN3 to PN4. In some embodiments, PN addition may be initiated due to a determination that one or more PNs have are approaching maximum storage capacity.

As noted, the database system may have problems determining the exact location of an extent during data migration. For example, a read/write operation described in FIG. 2 may not be able to determine in a timely fashion whether an extent is in the current PN or in a new PN, thus potentially causing a downtime for the read/write operation. But as will be described in more detail, the inventors propose to perform the large majority of writes on the new physical node, and the large majority of reads on the extents' current physical nodes assigned prior to the data migration. This advantageously allows for zero downtime for reads, as the reads are guaranteed to be served due to the initial PN storing the extent until the end of the data migration, and zero downtime for writes, as the extents are guaranteed to end up in the new PN at the end of the data migration.

Figure 7A:
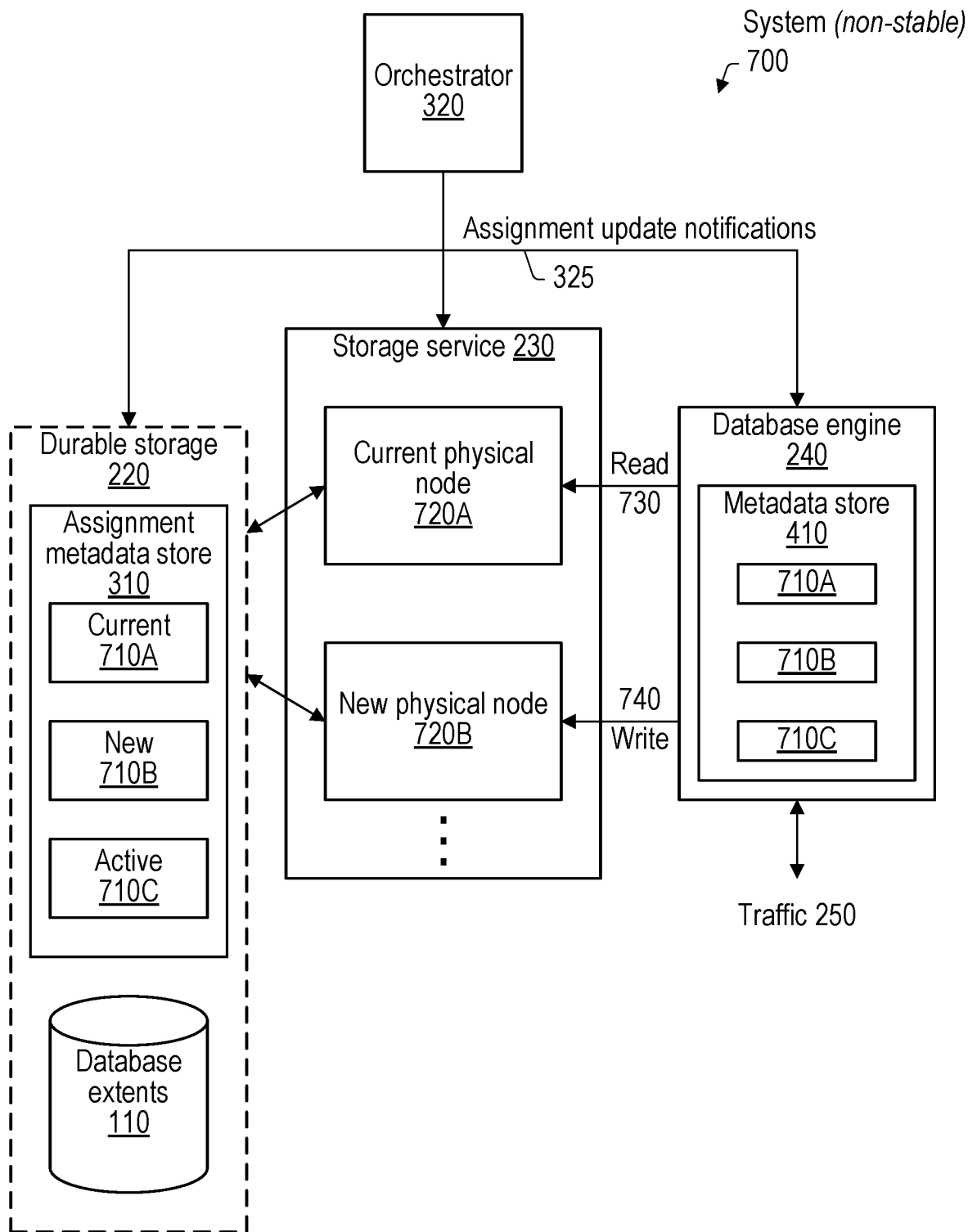
FIG. 7A is a block diagram embodiment of a database system undergoing a migration of extents between different physical nodes.
Figure 7B:
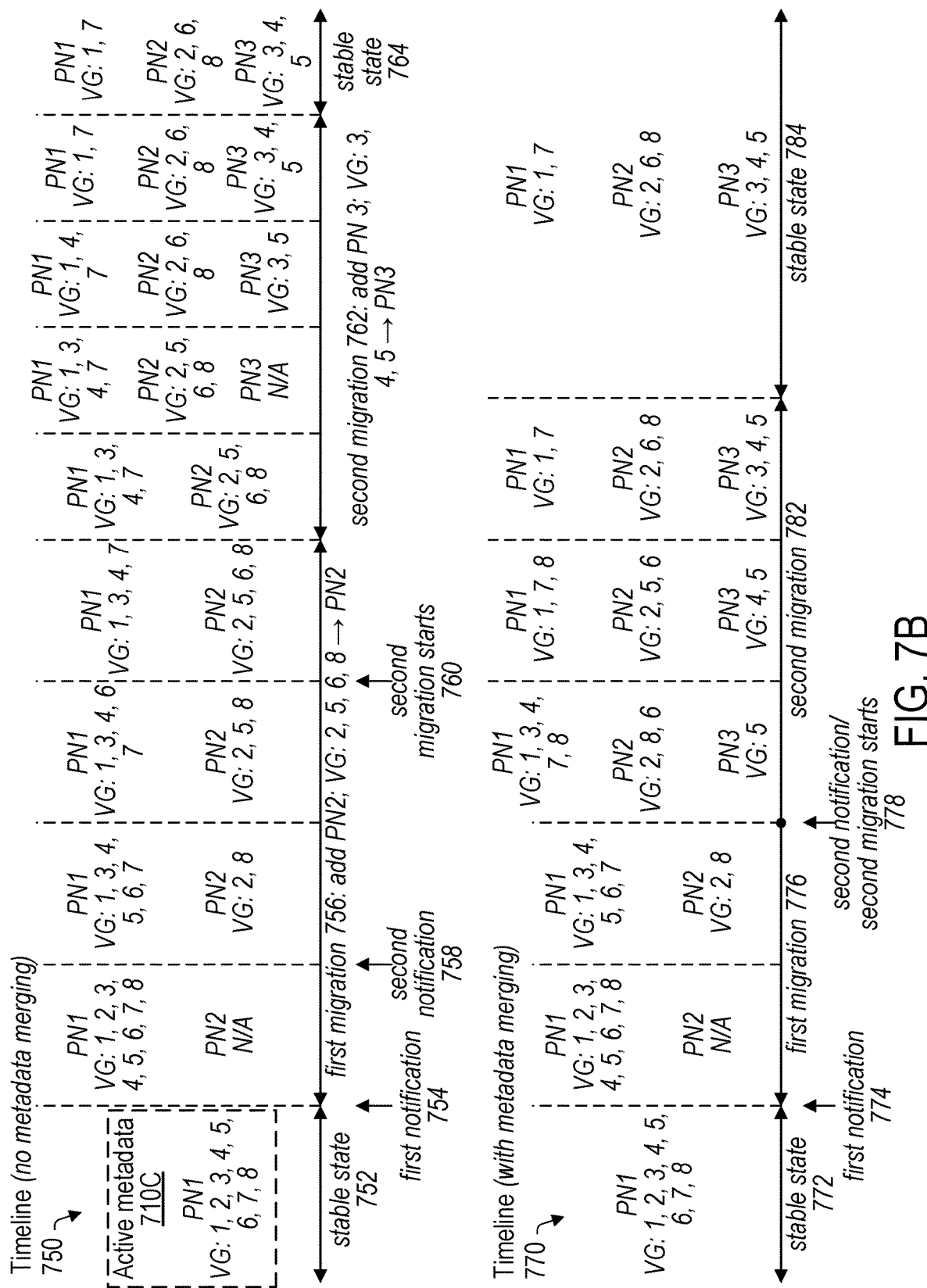
FIG. 7B is a timing diagram comparing consecutive node migrations with and without migration merging.

As noted, these changes in assignments may have implications on reads/writes, as will be described in more detail with respect to FIGS. 7-8. FIG. 7A is a block diagram depicting a database system that is undergoing a migration of virtual groups of extents from one physical node to another. FIG. 7B is a timing diagram comparing consecutive node migrations with and without migration merging. FIGS. 8A-B describe in more detail I/O operations during data migration.

Turning now to FIG. 7A, a block diagram of a database system during a data migration is depicted. In the illustrated embodiment, database extents for a particular VG are being migrated from current physical node 720A to new physical node 720B. During the migration, database engine 240 may receive read and write requests that need to be handled.

Orchestrator 320 first initiates the migration of extents of a given virtual group from one physical node to another physical node via assignment update notification 325. In some embodiments, an indication of a migration causes physical node 720B to download the physical extents from durable storage 220. But in other embodiments, new physical node 720B receives the extents from current physical node 720A. Receipt of assignment update notification 325 may further signal nodes 720 and database engine 240 to deploy special procedures (see FIGS. 8A-B) to handle database requests receiving while the system is completing the transfer, which can be referred to as a "non-stable" system state. Once migration is complete (and the system is again in a "stable" state), orchestrator 320 may accordingly send another notification to concerned components of the database system. Thus, the operations may return to those depicted with respect to FIG. 3. Although FIG. 7A depicts a migration from a single current PN 720A to a single new PN 720B, orchestrator 320 may initiate, for a single data migration, multiple movements of data between other PN pairs.

As shown, assignment metadata store 310 may store multiple copies of assignment metadata. Current assignment metadata 710A stores mappings of virtual groups to physical nodes prior to a migration, while new assignment metadata 710B stores mappings that will be in effect at the conclusion of the migration. As will be described with respect to FIG. 7B, assignment metadata store 310 may also store another version of the assignment metadata (710C) that can be used to track the current status of an in-process migration.

As noted, it is desirable for system 700 to be able to service database requests during a data migration. Thus, while system 700 is in a non-stable state, it may service requests differently from when system 700 is in a stable state. In one embodiment, system 700 stores 1) current assignment metadata 710A mapping virtual groupings of database extents 110 to physical nodes 720 prior to a data migration, and 2) new assignment metadata 710B mapping virtual groupings of database extents 110 current physical node 720A after the migration (i.e., the mappings that are to result from the migration). During the data migration, engine 240 may receive traffic 250 that includes read requests and write requests for the distributed database system. In response to a read request 730, engine 240 may send a request to storage service 230 to read data from current physical storage node 720A identified using current assignment metadata 710A (which may be cached in metadata store 410). The reason for this routing is that the data will remain at the old physical node (720A) until the data migration is complete. Routing a read request to the new physical node (720B) may result in the data not yet being present at that node. A possible exception to this flow is discussed in FIG. 8A below. On the other hand, in response to write request 740, engine 240 routes the request to new physical node 720B identified using the new assignment metadata 710B (again, which may be cached in 410). Once the data migration is complete, computer system 700 may be placed in a stable state, and exclusively use assignments of new assignment metadata 710B. Handling of read request 730 and write request 740 are discussed in more detail with respect to FIGS. 8A-B.

As noted, system 700 may have physical nodes 720 in other availability zones. Accordingly, orchestrator 320 may separately manage additional versions of assignment metadata 710 in store 310 (e.g., separate copies of assignment metadata 710A-C for each AZ). Additionally, as noted with respect to FIG. 6B-C, system 700 may use different hashing operations for extent mappings based on the availability zone of physical nodes 720. If one of the physical nodes 720 is unavailable for a read or write request for an extent because its corresponding PN 720 is unavailable in a first AZ, database engine 240 may reroute (e.g., by inputting the extent's ID in a second, different hashing operation) the read or write request to a PN in a second AZ that stores a replica of the request's extent. Note that another advantage of using multiple availability zones with different operations during migration is that each availability zone will be migrated differently due to the different extent-VG mappings, thus causing each migration in each AZ to be independent from other migrations simultaneously happening at other AZs.

Turning now to FIG. 7B, a diagram with two timelines is shown. Timeline 750 depicts data migration without migration merging, while timeline 770 depicts data migration with migration merging. Both timelines describe the locations of the virtual groups with respect to PNs at different times throughout two consecutive migration operations. The first migration (indicated by reference numeral 756 in timeline 750 and by reference numeral 776 in timeline 770) adds a second physical node PN2, and the second migration (reference numerals 762 and 782) adds a third physical node PN3. In both timelines, the second migration is indicated (e.g., by orchestrator 320) prior to the first migration being completed.

FIG. 7B depicts examples of active assignment metadata 710C as it changes over time during the two data migrations. As noted, metadata 710C may be created, modified, and maintained by orchestrator 320. Additionally, orchestrator 320 is able to update active metadata 710C throughout the data migrations to reflect the current assignment of virtual groups of extents to physical nodes. In some cases, orchestrator 320 may place the system in a stable state once it determines that active metadata 710C is identical to new metadata 710B (i.e., where new metadata 710B is the intended mapping after both migrations).

As noted, timeline 750 depicts the succession of PN→VG assignments during two data migrations without migration merging. Timeline 750 begins with the system being in a stable state at 752 and receiving first notification 754 for first migration 756 in which PN2 is added. The system thus enters an active state in which nodes are to be eventually balanced between PN1 and newly added PN2. As shown, when the system receives second notification 758 indicating a second migration, VGs 2 and 8 have been migrated to PN2, but VGs 5 and 6 have not. In this scenario, the system waits until the first migration is complete at 760 prior to starting the second migration caused by the second notification at 758. Once the second migration is completed, the system returns to a stable state at 764.

In timeline 770, second notification 778 is also received at a point during first migration 776, which had caused VGs 2 and 8 (but not 5 and 6) to be transferred to PN2. But in contrast to timeline 750, timeline 770 shows the transfer to VGs 3, 4, and 5 to PN3 and the transfer of VG 6 to PN2 beginning right after receiving second notification 778. As such, it can be seen that second migration 782 in timeline 770 finishes earlier than second migration 762 in timeline 750. Further, it is noted that VG5, in timeline 750, is first migrated from PN1 to PN2 in the first migration, then again from PN2 to PN3 in the second migration. This is inefficient, as VG5 has been moved twice across PNs, even though it could have been moved once, as second notification 758 was received prior to the moving of VG5 to PN2. Although this example shows a relatively small number of such inefficiency, the scale of implementations may mean that millions of such virtual groups may be unnecessarily migrated.

The efficiency of timeline 770 is gained by what can be referred to as migration merging. At the time of first migration 776, current metadata 710A indicates that VG1-8 are assigned to PN1. First migration 776 causes new metadata 710B to indicate the desired configuration of PN1 having VGs 1, 3, 4, 7 and PN2 having VGs 2, 5, 6, and 8. During first migration 776, active metadata 710C is updated as individual VGs are transferred. Thus, at the time of second migration 778, active metadata 710C indicates that PN1 has VGs 1, 3, 4, 5, 6, and 7, while PN2 has VGs 2 and 8. Additionally, second migration 778 causes active metadata 710C to be written to current metadata 710A. First migration 776 and second migration 782 are then merged, and use newly updated current metadata 710A as the starting point. Additionally, new metadata 710B is written to have the desired configuration (PN1 having VGs 1 and 7, PN2 having VGs 2, 6, and 8, and PN3 having VGs 3, 4, and 5). Merging of the two migrations, in one embodiment, involves overwriting instructions of first migration 776 that are superseded by instructions of second migration 782. For example, first migration 776 indicates that VGs 2, 5, 6, and 8 are to be moved to PN2. After migration merging is complete, newly updated current metadata 710A indicates that VGs 2 and 8 have already been moved to PN2. Additionally, second migration 782 indicates that VG 5 is to be moved to PN3 instead of PN2. Accordingly, the merged migration can then proceed to move VG 6 to PN2 and VGs 3, 4, and 5 to PN3. Active metadata 710C is updated during the progress of the merged migration. When active metadata 710C is equal to new metadata 710B, the migration is complete and the system returns to stable state 784.

Figure 8A:
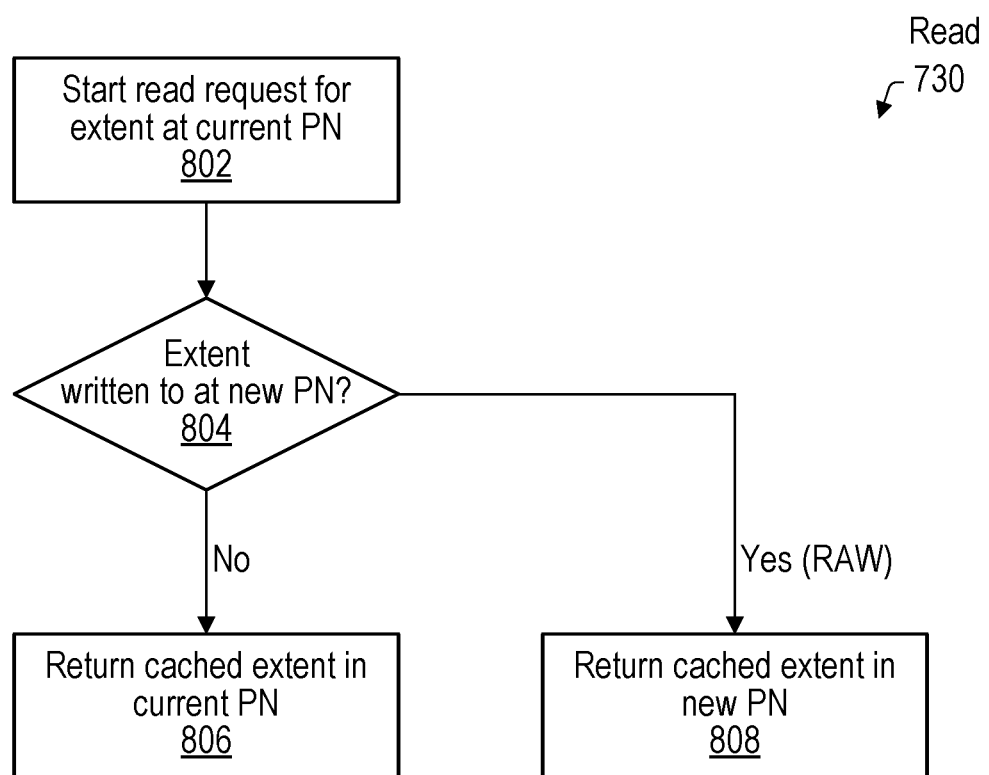
FIG. 8A is a flow diagram of a database read request during data migration.

Turning now to FIG. 8A, a flow diagram for handling a read request 730 during migration is shown. In some embodiments, the depicted request is performed by database engine 240.

To facilitate read request 730, the current physical node whose virtual groups are being migrated may store its extents in its own cache until the migration. As will be described below, this advantageously allows database engine 240 to have a guarantee that a given extent will be in the current node (e.g., node 720A) during the transfer, regardless of whether the virtual group the extent belongs to has been completely migrated (e.g., to node 720B).

The system first initiates the read request at 802. In some embodiments, the read request is initiated by database engine 240 in response to receiving, when in an active state (i.e., during a data migration), read traffic for data stored in a particular extent. The database engine may, in some cases, determine the current PN (e.g., PN 720A) corresponding to the specific extent using at least a hashing operation (e.g., operation 140) and current assignment metadata (e.g., current assignment metadata 710A).

At 804, the system determines whether the specified extent has been written to (e.g., due to a prior write request 740 that specifies the same extent). If the extent has not been written to, the system may perform a read at 806, where the system immediately returns the extent stored in the current PN (and not the new PN) with no downtime needed to determine the location of the extent. Thus, the system may use data stored in current metadata regardless of whether the migration is complete.

But if the system has serviced a write request 740 prior to servicing read request 730 (in other words, a read-after-write (RAW) scenario), then the system may retrieve at 808 the written extent from the new PN (e.g., PN 720B) and use it to service read request 730. Accordingly, this allows for the retrieval of the newest version of data in the extent.

The flow diagram shown in FIG. 8A may have more steps than shown. For example, there may be a scenario in which the system attempts to return a cached extent in the current PN at 806, but due to a cache miss, retrieval of the data from durable storage is undertaken. Because this retrieval may take a relatively long time, a trigger occurs and the client (the calling entity) takes a short timeout. An additional read is then attempted at the new PN at 808. In other words, the system performs what is referred to as a "hedged" read, which entails performing operations of both 806 and 808 if a timeout has occurred at 806. After initiating both requests, the system proceeds to use the extent returned from whichever request (at 806 or 808) retrieves the extent first.

In some embodiments, the determination at 804 may be performed using active assignment metadata 710C (or any other metadata stored in the system) that includes an indication whether the particular extent (or the extent's assigned virtual group) has been written to by a prior write request. This indication may be a timestamp, a version identifier, a dirty bit, etc. The invalidation of extents in assignment metadata is described in more detail with respect to FIG. 8B.

Figure 8B:
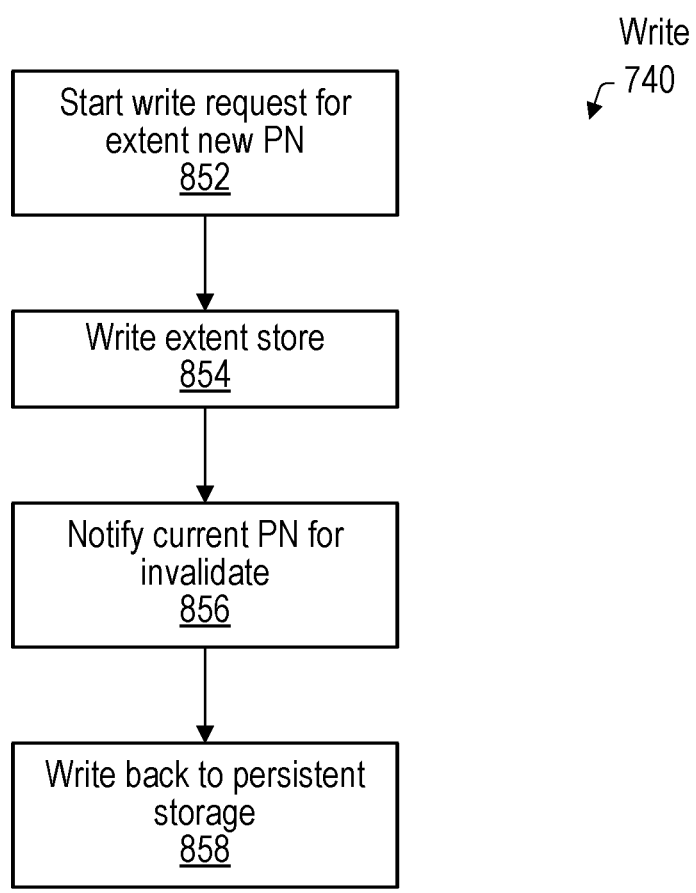
FIG. 8B is a flow diagram of a database write request during data migration.

Turning now to FIG. 8B, a block diagram of a write request 740 is shown. In some embodiments, the depicted request is performed by database engine 240. The system first initiates the write request at 852. In some embodiments, the write request may be initiated by database engine 240 in response to receiving write traffic for data stored in a specific extent. At 854, the system performs the extent write operation at the new PN (e.g., new PN 720B) specified in new assignment metadata (e.g., metadata 710B) regardless of whether the migration is complete (e.g., regardless of the state of the system).

At 856, the database system notifies the current PN of the write (e.g., so that current PN 720A can invalidate its own extent at 808 and service reads in a RAW scenario such as was described in FIG. 8A). Various methods may be used to signal the invalidation to the various components of system 100. As one example, the new PN may send an invalidation message to the old PN, and the old PN will invalidate and/or evict the extent it had cached (and cause subsequent invalidations elsewhere if needed). As another example, the new PN modifies active assignment metadata 710C in metadata store 310 in durable storage 220 to signal the invalidation (e.g., via a dirty bit, a different version number, an identifier, a timestamp, etc.). In that case, orchestrator 320 may detect the change in active assignment metadata 710C and notify all other entities so that they download the newly modified metadata that includes the invalidation. As yet another example, the extent replica itself may have additional metadata for its own invalidation status, and any entity storing the extent will thus be aware of its validity.

Furthermore, the invalidations described herein may be at various granularities. In some cases, the invalidations are at the granularity of the extent (e.g., each extent has its own dirty bit, version number, etc.). But in other cases, the invalidations are at the granularity of the virtual group the extent maps to (e.g., if a VG has two extents, a write to one of the extents will cause the invalidation of the entire VG, thus also invalidating the other extent).

At 858, the physical node writes the modified extent back to persistent storage. In some cases, this is performed when the data is written to the PN. But in other cases, 858 is performed periodically and not necessarily immediately after 856. For example, the PN at which the write was completed may perform the write-back at every notification (e.g., notification 325), regardless of whether the notification includes a migration that involves the PN specified in the write request. In one scenario, there are additional data migrations caused by the notification 325 that do not involve PN 720B. For example, the system may cause a migration involving PNs 720A and 720C (but not PN 720B), and send a notification 325 to that effect. In that case, even though 720B is not involved in that particular migration, it may still write back its dirty extents to memory.

Figure 9:
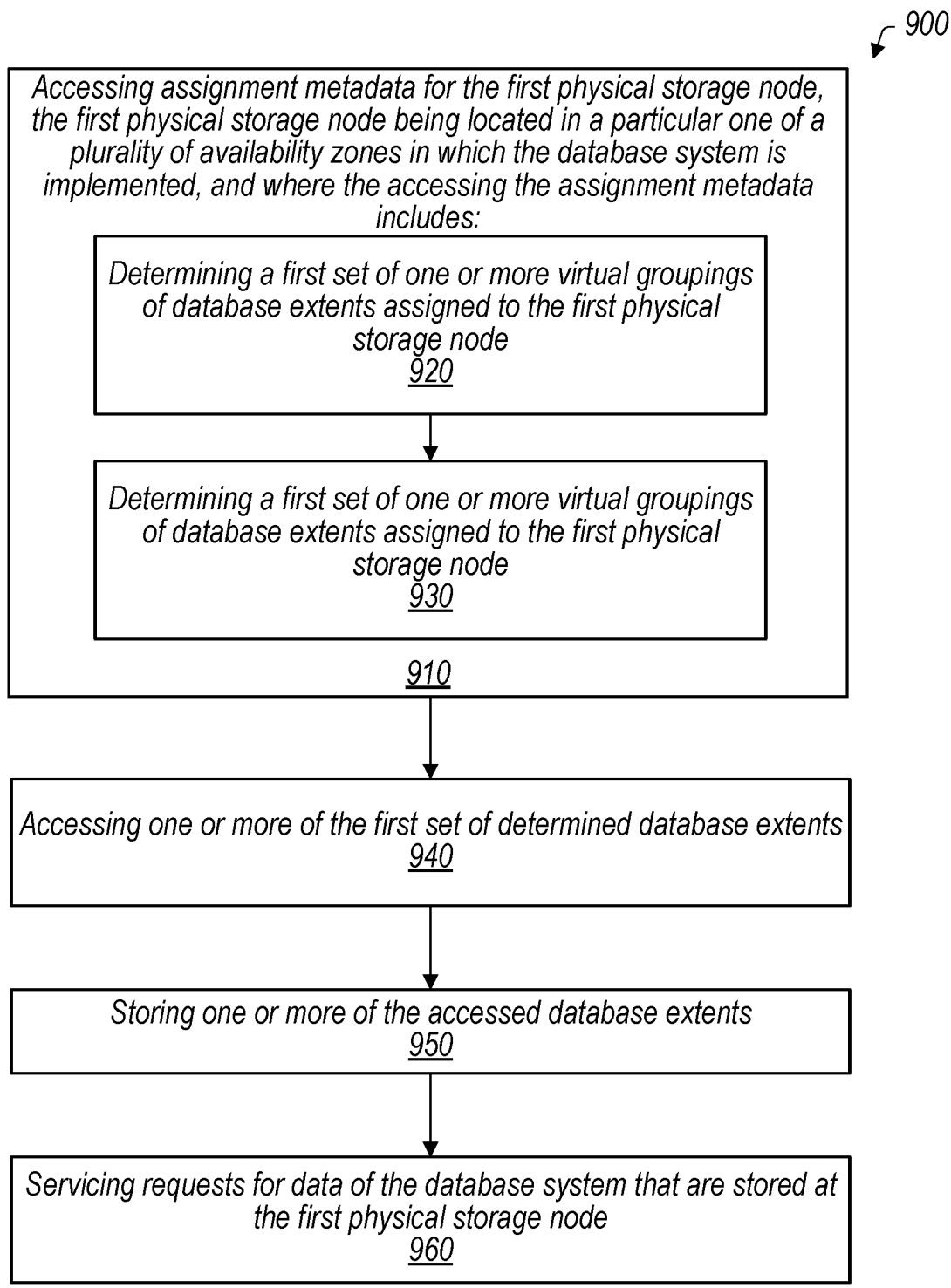
FIG. 9 is a flow diagram of one embodiment of a method for storing database extents in physical storage nodes.

Turning now to FIG. 9, a flow diagram of a method 900 for storing database extents in physical storage nodes is shown. Method 900 may be performed for example by a physical storage node 120. Method 900 may be performed by executing a set of program instructions stored on a non-transitory computer-readable medium. Method 900 is susceptible to numerous variations, some of which are noted below.

Method 900 begins in 910 with a physical storage node (e.g., PN 120A) of a storage service (e.g., storage service 230) of a database system (e.g., system 200), assignment metadata (e.g., assignment metadata 150 in assignment metadata store 310) for the physical storage node, the first physical storage node being located in a particular one of a plurality of availability zones (e.g., AZ 305) in which the database system is implemented.

The accessing the assignment metadata includes 1) in 920, the determining of a first set of one or more virtual groupings (e.g., virtual groups 130) of database extents (e.g., database extents 110) assigned to the first physical storage node and 2) in 930, a first set of database extents associated with the determined one or more virtual groupings, where a corresponding virtual grouping for a given one of the first set of database extents is determinable by performing a first hashing operation (e.g., hashing operation 140) that uses an identifier (e.g., extent identifier 115) for the given database extent. The assignment metadata may be accessed from persistent storage of a cloud computing system that also persistently stores database extents of the database system, such that the storage service operates as a write-through cache for the persistent storage. The hashing operation may include applying a first hash function to a first value that includes an identifier for the particular availability zone and the identifier for the given database extent.

In 930, the physical storage node accesses (e.g., from durable storage 220) one or more of the first set of determined database extents.

In 940, the physical storage node stores (e.g., in extent cache 340) one or more of the accessed database extents.

In 950, the physical storage node services requests (e.g., from database engine 240) for data of the database system that are stored (e.g., as cached extents 345) at the first physical storage node.

In some embodiments, the assignments of virtual groupings to physical nodes may change. In some embodiments, the change in assignments includes assigning each physical storage node an equal number of virtual groupings of database extents. Method 900 may further include receiving an indication of a change in assignments of virtual groupings to physical storage nodes of the storage service, the change in assignments resulting in a second, different set of one or more virtual groupings of database extents being assigned to the first physical storage node and updating virtual groupings of database extents being stored at the first physical storage node to reflect the change in assignments. Accordingly, the physical storage node may, in response to the change in assignments indicating that a particular one of the first set of virtual groupings is now part of the second set of virtual groupings and is assigned to a different physical storage node, retain those database extents corresponding to the particular one of the first set of virtual groupings at the first physical storage node during a transition period until migration to the different physical storage node is complete. When the migration is complete, the physical storage node may receive a completion notification indicating that the migration to the different physical storage node is complete, and evicting, from the first physical storage node based on the completion notification, the retained database extents.

As noted, the techniques described above can allow the physical storage node's system to service reads and writes with zero downtime hedged reads: the physical storage node may receive a read request for a first database extent assigned to the particular virtual grouping, respond to the read request by reading data from the first physical storage node. Additionally, the physical storage node may receive a write request for a second database extent assigned to the particular virtual grouping and respond to the write request by writing data to the different physical storage node.

The physical storage nodes may be present in multiple availability zones. Thus, in some embodiments, the plurality of availability zones are configured such that the given database extent maps to a particular virtual grouping in the particular availability zone via the first hashing operation, but the given database extent maps to a different virtual grouping in at least one or more remaining ones of the plurality of availability zones via hashing operations that produce different results from the first hashing operation. Accordingly, the plurality of availability zones utilize different hashing operations such that deletion of a particular physical storage node in all of the plurality of availability zones does not cause migration of identical database extents in each of the plurality of availability zones. In some cases, the first hashing operation is performed by applying a first hash function to a first value that includes an identifier for the particular availability zone and the identifier for the given database extent, and a hashing operation for a given one of the one or more remaining availability zones includes the first hash function being applied to a second value that includes an identifier for the particular availability zone and the identifier for the given database extent.

Figure 10:
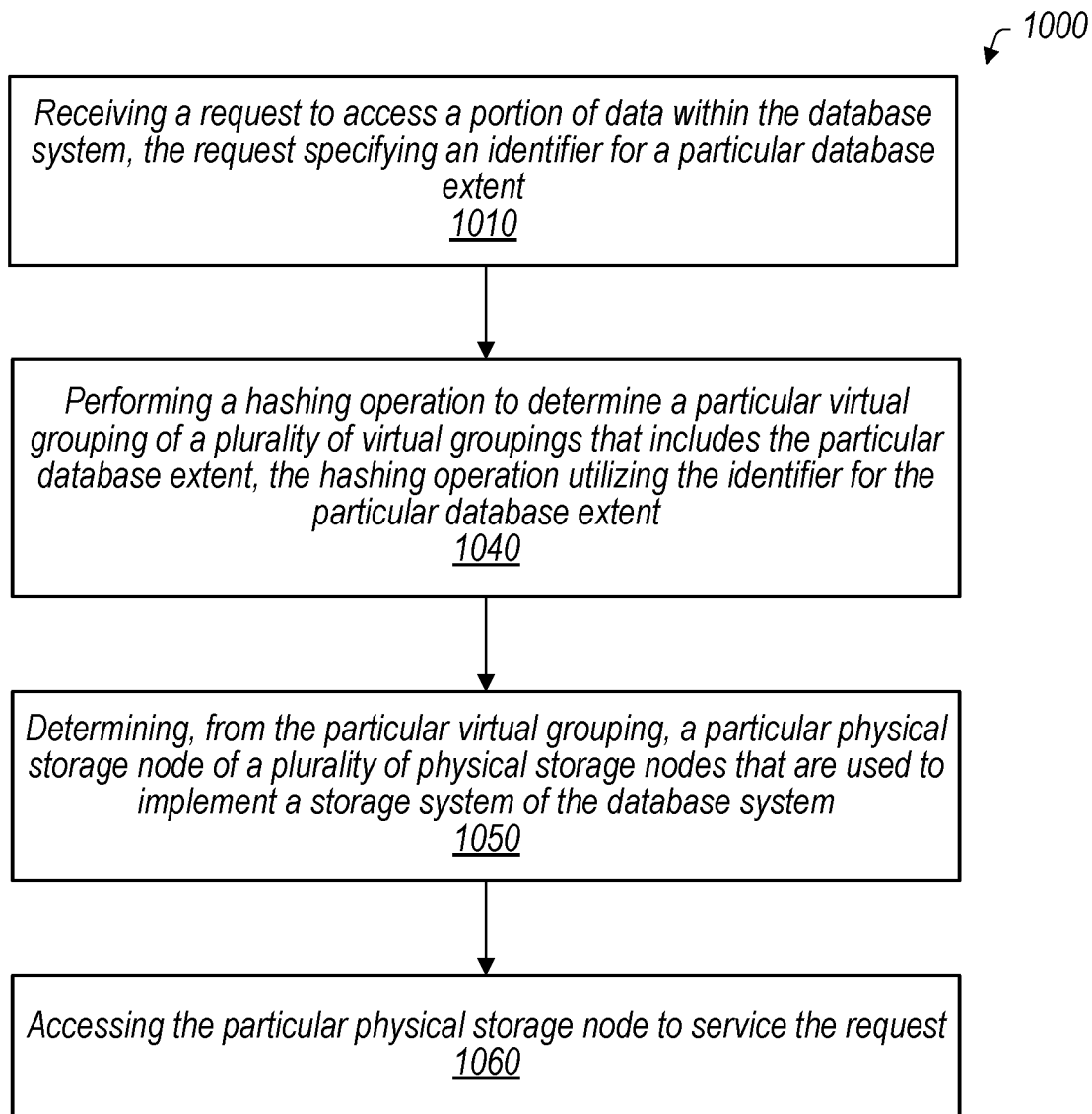
FIG. 10 is a flow diagram of one embodiment of a method for accessing database extents stored in physical storage nodes.

Turning now to FIG. 10, a flow diagram of a method 1000 for accessing database extents stored in physical storage nodes is shown. Method 1000 may be performed for example by a computer system (e.g., database engine 240) configured to receive client requests for a database system (e.g., database system 100). Method 1000 may be performed by executing a set of program instructions stored on a non-transitory computer-readable medium. Method 1000 is susceptible to numerous variations, some of which are noted below.

Method 1000 begins in 1010 with the computer system (e.g., database engine 240) receiving, a request (e.g., in traffic 250) to access a portion of data within the database system, the request specifying an identifier for a particular database extent (e.g., extents 110).

In 1020, the computer system performs a hashing operation (e.g., hashing operation 140) to determine a particular virtual grouping (e.g., VG 130) of a plurality of virtual groupings that includes the particular database extent, the hashing operation utilizing the identifier (e.g., identifier 115) for the particular database extent. In some embodiments, the hashing operation is performed by applying a first hash function to a first value that includes an identifier for a first one of a plurality of availability zones and the identifier for the particular database extent, and a hashing operation for a second one of the one or more remaining availability zones includes the first hash function being applied to a second value that includes an identifier for the particular availability zone and the identifier for the particular database extent.

In 1030, the computer system determines a particular physical storage node (e.g., PN 120A) of a plurality of physical storage nodes that are used to implement a storage system of the database system.

In 1040, the computer system accesses (e.g., via database transactions 425) the particular physical storage node to service the request.

The computer system may be interacting with physical storage node undergoing a data migration. Thus in some embodiments, the computer system may receive an indication of a change in assignments of virtual groupings to physical storage nodes, the change in assignments resulting in a second, different set of one or more virtual groupings of database extents being assigned to the particular physical storage node. Then, the computer system may access, in response to the receiving, updated assignment metadata corresponding to the change in assignment.

The computer system may cause the creation of a new extent. In some cases, the computer system receives a request to create data not stored in any of the database extents and accordingly generates an extent identifier. Then, the system performs using at least the generated extent identifier, a hashing operation to determine a particular virtual grouping of the plurality of virtual groupings, and determines a particular physical storage node of a plurality of physical storage nodes that are used to implement a storage system of the database system. Finally, the system may cause the storing of the created data in the determined particular physical storage node.

Figure 11:
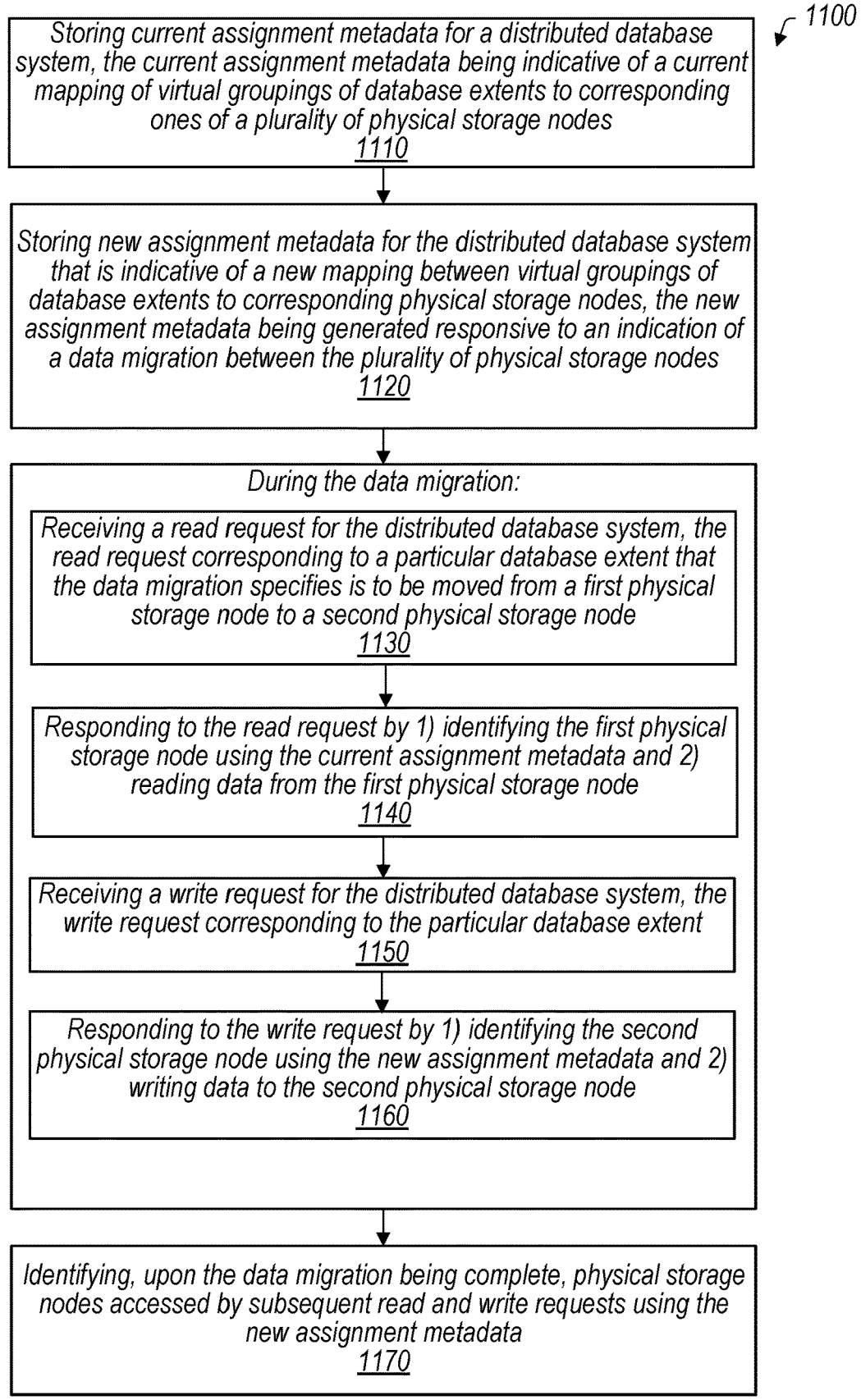
FIG. 11 is a flow diagram of one embodiment of a method for accessing database extents stored in physical storage nodes during data migration.

Turning now to FIG. 11, a flow diagram of a method 1100 for accessing database extents stored in physical storage nodes during data migration is shown. Method 1100 is one embodiment of a method performed by a database system (e.g., database system 700). Method 1100 may be performed by executing a set of program instructions stored on a non-transitory computer-readable medium. Method 1100 is susceptible to numerous variations, some of which are noted below.

Method 1100 begins in 1110 with the database system storing current assignment metadata (e.g., current assignment metadata 710A) for the distributed database system, the current assignment metadata being indicative of a current mapping of virtual groupings (e.g., virtual groups 130) of database extents (e.g., extents 110) to corresponding ones of a plurality of physical storage nodes (e.g., current physical node 720A).

In 1120, the database system stores new assignment metadata (e.g., new assignment metadata 710B) for the distributed database system that is indicative of a new mapping between virtual groupings of database extents to corresponding ones of the plurality of physical storage nodes, the new assignment metadata being generated responsive to an indication (e.g., notification 325) of a data migration between the plurality of physical storage nodes (e.g., data migration between current physical node 720A and 720B). In some embodiments, the storing of the new assignment metadata further comprises receiving, from an orchestrator, an indication that the new assignment metadata was generated and downloading, by the computer system from durable storage, the new assignment metadata.

More versions of assignment metadata may be stored. In some embodiments, the database system may further store active assignment metadata for the distributed database system, where the active assignment metadata is updated throughout the data migration, and is usable to determine when the data migration is complete by comparing the active assignment metadata to the new assignment metadata.

During the data migration, in 1130, the database system receives a read request (e.g., read request 730) for the distributed database system, the read request corresponding to a particular database extent that the data migration specifies is to be moved from a first physical storage node (e.g., current physical node 720A) to a second physical storage node (e.g., new physical node 720B). Then, the system at 1140 responds to the read request responding to the read request by 1) identifying the first physical storage node using the current assignment metadata and 2) reading data from the first physical storage node.

In some embodiments, identifying the first physical storage node using the current assignment metadata further comprises performing, using an identifier for the particular database extent, a hashing operation that maps the particular database extent to a given virtual grouping and determining that the given virtual grouping corresponds to the first physical storage node.

Also during the data migration, at 1150, the database system receives a write request (e.g., write request 740) for the distributed database system, the write request corresponding to the particular database extent. Then, the system at 1160 responds to the write request by 1) identifying the second physical storage node using the new assignment metadata and 2) writing data to the second physical storage node.

In some cases, the extent to be used in read request 730 may have been written to. Thus, the database system may respond to a different read request by identifying, using the current assignment metadata, a third physical storage node for the different read request, determining, when responding to the different read request, that data requested by the different read request has been updated in a fourth physical storage node identified in the new assignment metadata, and reading the data requested by the different read request from the fourth physical storage node rather than the third physical storage node.

In 1170, the database system, upon the data migration being complete, identifies physical storage nodes (e.g., new physical storage node 720B) accessed by subsequent read and write requests using the new assignment metadata.

The assignment metadata may be maintained across availability zones. Thus, in some embodiments, the plurality of physical storage nodes are hosted at a given availability zone, and the current assignment metadata and the new assignment metadata indicate a mapping for the physical storage nodes within the availability zone. Furthermore, the system may, for a different memory access request that maps to a specified physical storage node in the given availability zone, 1) determine in response to the different memory access request, that the specified physical storage node is unavailable, and route, in response to the determining, the different memory access request to a corresponding physical storage node within a different one of the plurality of availability zones, the corresponding physical storage node being identified using assignment metadata for the different availability zone.

Hashing operations may differ based on availability zone. The system may identify the first physical storage node using the current assignment metadata using a first hashing operation on the particular database extent, and identify a particular physical storage node for the particular database extent in a different one of the plurality of availability zones using a second, different hashing operation. In some embodiments, the first and second hashing operations may hash different inputs based on the given availability zone and the different availability zone. In other embodiments, the first and second hashing operations utilize different hashing functions.

In some embodiments, the system implements migration merging to facilitate data migration. In that case, the database system receives, during the data migration, a second indication of a different data migration. Then, the database system 1) copies the active assignment metadata to the current assignment metadata and 2) merges the data migration and the different data migration into a merged data migration, where the merging includes changing any migration instructions in the data migration that are overwritten by the different data migration. The database system then sets the new assignment metadata to be a desired configuration specified by the merged data migration, and completes the merged data migration using the newly copied current assignment metadata.

Various techniques described herein, may be performed by one or more computer programs. The term "program" is to be construed broadly to cover a sequence of instructions in a programming language that a computing device can execute or interpret. These programs may be written in any suitable computer language, including lower-level languages such as assembly and higher-level languages such as Python.

Program instructions may be stored on a "non-transitory, computer-readable storage medium" or a "non-transitory, computer-readable medium." The storage of program instructions on such media permits execution of the program instructions by a computer system. These are broad terms intended to cover any type of computer memory or storage device that is capable of storing program instructions. The term "non-transitory," as is understood, refers to a tangible medium. Note that the program instructions may be stored on the medium in various formats (source code, compiled code, etc.).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

Note that in some cases, program instructions may be stored on a storage medium but not enabled to execute in a particular computing environment. For example, a particular computing environment (e.g., a first computer system) may have a parameter set that disables program instructions that are nonetheless resident on a storage medium of the first computer system. The recitation that these stored program instructions are "capable" of being executed is intended to account for and cover this possibility. Stated another way, program instructions stored on a computer-readable medium can be said to "executable" to perform certain functionality, whether or not current software configuration parameters permit such execution. Executability means that when and if the instructions are executed, they perform the functionality in question.

Similarly, systems that implement the methods described with respect to any of the disclosed techniques are also contemplated. One such environment in which the disclosed techniques may operate is a cloud computer system. A cloud computer system (or cloud computing system) refers to a computer system that provides on-demand availability of computer system resources without direct management by a user. These resources can include servers, storage, databases, networking, software, analytics, etc. Users typically pay only for those cloud services that are being used, which can, in many instances, lead to reduced operating costs. Various types of cloud service models are possible. The Software as a Service (SaaS) model provides users with a complete product that is run and managed by a cloud provider. The Platform as a Service (PaaS) model allows for deployment and management of applications, without users having to manage the underlying infrastructure. The Infrastructure as a Service (IaaS) model allows more flexibility by permitting users to control access to networking features, computers (virtual or dedicated hardware), and data storage space. Cloud computer systems can run applications in various computing zones that are isolated from one another. These zones can be within a single or multiple geographic regions.

A cloud computer system includes various hardware components along with software to manage those components and provide an interface to users. These hardware components include a processor subsystem, which can include multiple processor circuits, storage, and I/O circuitry, all connected via interconnect circuitry. Cloud computer systems thus can be thought of as server computer systems with associated storage that can perform various types of applications for users as well as provide supporting services (security, load balancing, user interface, etc.).

One common component of a cloud computing system is a data center. As is understood in the art, a data center is a physical computer facility that organizations use to house their critical applications and data. A data center's design is based on a network of computing and storage resources that enable the delivery of shared applications and data.

The term "data center" is intended to cover a wide range of implementations, including traditional on-premises physical servers to virtual networks that support applications and workloads across pools of physical infrastructure and into a multi-cloud environment. In current environments, data exists and is connected across multiple data centers, the edge, and public and private clouds. A data center can frequently communicate across these multiple sites, both on-premises and in the cloud. Even the public cloud is a collection of data centers. When applications are hosted in the cloud, they are using data center resources from the cloud provider. Data centers are commonly used to support a variety of enterprise applications and activities, including, email and file sharing, productivity applications, customer relationship management (CRM), enterprise resource planning (ERP) and databases, big data, artificial intelligence, machine learning, virtual desktops, communications and collaboration services.

Data centers commonly include routers, switches, firewalls, storage systems, servers, and application delivery controllers. Because these components frequently store and manage business-critical data and applications, data center security is critical in data center design. These components operate together provide the core infrastructure for a data center: network infrastructure, storage infrastructure and computing resources. The network infrastructure connects servers (physical and virtualized), data center services, storage, and external connectivity to end-user locations. Storage systems are used to store the data that is the fuel of the data center. In contrast, applications can be considered to be the engines of a data center. Computing resources include servers that provide the processing, memory, local storage, and network connectivity that drive applications. Data centers commonly utilize additional infrastructure to support the center's hardware and software. These include power subsystems, uninterruptible power supplies (UPS), ventilation, cooling systems, fire suppression, backup generators, and connections to external networks.

Data center services are typically deployed to protect the performance and integrity of the core data center components. Data center therefore commonly use network security appliances that provide firewall and intrusion protection capabilities to safeguard the data center. Data centers also maintain application performance by providing application resiliency and availability via automatic failover and load balancing.

One standard for data center design and data center infrastructure is ANSI/TIA-942. It includes standards for ANSI/TIA-942-ready certification, which ensures compliance with one of four categories of data center tiers rated for levels of redundancy and fault tolerance. A Tier 1 (basic) data center offers limited protection against physical events. It has single-capacity components and a single, nonredundant distribution path. A Tier 2 data center offers improved protection against physical events. It has redundant-capacity components and a single, nonredundant distribution path. A Tier 3 data center protects against virtually all physical events, providing redundant-capacity components and multiple independent distribution paths. Each component can be removed or replaced without disrupting services to end users. A Tier 4 data center provides the highest levels of fault tolerance and redundancy. Redundant-capacity components and multiple independent distribution paths enable concurrent maintainability and one fault anywhere in the installation without causing downtime.

Many types of data centers and service models are available. A data center classification depends on whether it is owned by one or many organizations, how it fits (if at all) into the topology of other data centers, the technologies used for computing and storage, and its energy efficiency. There are four main types of data centers. Enterprise data centers are built, owned, and operated by companies and are optimized for their end users. In many cases, they are housed on a corporate campus. Managed services data centers are managed by a third party (or a managed services provider) on behalf of a company. The company leases the equipment and infrastructure instead of buying it. In colocation ("colo") data centers, a company rents space within a data center owned by others and located off company premises. The colocation data center hosts the infrastructure: building, cooling, bandwidth, security, etc., while the company provides and manages the components, including servers, storage, and firewalls. Cloud data centers are an off-premises form of data center in which data and applications are hosted by a cloud services provider such as AMAZON WEB SERVICES (AWS), MICROSOFT (AZURE), or IBM Cloud.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" be used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . W, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112 (f) for that claim element. Should Applicant wish to invoke Section 112(f) during prosecution of a United States patent application based on this disclosure, it will recite claim elements using the "means for" [performing a function] construct.

What is claimed is:

1. A method for servicing memory requests while migrating data within a distributed database system, the method comprising:

storing, by a computer system, current assignment metadata for the distributed database system that identifies a current mapping of virtual groupings of database extents to corresponding ones of a plurality of physical storage nodes;

storing, by the computer system, new assignment metadata for the distributed database system that identifies a new mapping between virtual groupings of database extents to corresponding ones of the plurality of physical storage nodes, the new assignment metadata being generated responsive to an indication of a data migration between the plurality of physical storage nodes;

after the storing of the current and new assignment metadata and during the data migration, the computer system:

receiving a read request corresponding to a particular database extent that the data migration specifies is to be moved from a first physical storage node to a second physical storage node;

responding to the read request by 1) identifying the first physical storage node using the current assignment metadata and 2) reading data from the first physical storage node;

receiving a write request corresponding to the particular database extent; and responding to the write request by 1) identifying the second physical storage node using the new assignment metadata and 2) writing data to the second physical storage node; and upon the data migration being complete, the computer system identifying physical storage nodes accessed by subsequent read and write requests using the new assignment metadata without using the current assignment metadata.

2. The method of claim 1, wherein identifying the first physical storage node using the current assignment metadata further comprises:

performing, by the computer system using an identifier for the particular database extent, a hashing operation that maps the particular database extent to a given virtual grouping; and determining, by the computer system, that the given virtual grouping corresponds to the first physical storage node.

3. The method of claim 2, wherein the storing of the new assignment metadata further comprises:

receiving, by the computer system from an orchestrator, an indication that the new assignment metadata was generated; and downloading, by the computer system from durable storage, the new assignment metadata.

4. The method of claim 1, further comprising:

responding to a different read request by:

identifying, by the computer system using the current assignment metadata, a third physical storage node for the different read request;

determining, by the computer system when responding to the different read request, that data requested by the different read request has been updated in a fourth physical storage node identified in the new assignment metadata; and reading, by the computer system, the data requested by the different read request from the fourth physical storage node rather than the third physical storage node.

5. The method of claim 1, wherein the plurality of physical storage nodes are hosted at a given one of a plurality of availability zones for the distributed database system, and wherein the current assignment metadata and the new assignment metadata indicate a mapping for the physical storage nodes within the given availability zone, and the method further comprises, for a different memory access request that maps to a specified physical storage node in the given availability zone:

determining, by the computer system in response to the different memory access request, that the specified physical storage node is unavailable; and routing, by the computer system in response to the determining, the different memory access request to a corresponding physical storage node within a different one of the plurality of availability zones, the corresponding physical storage node being identified using assignment metadata for the different availability zone.

6. The method of claim 1, wherein the plurality of physical storage nodes are hosted at a given one of a plurality of availability zones for the distributed database system, and wherein:

identifying the first physical storage node using the current assignment metadata is performed using a first hashing operation on the particular database extent; and identifying a particular physical storage node for the particular database extent in a different one of the plurality of availability zones is performed using a second, different hashing operation.

7. The method of claim 6, wherein the first and second hashing operations hash different inputs based on the given availability zone and the different availability zone.

8. The method of claim 6, wherein the first and second hashing operations utilize different hashing functions.

9. The method of claim 1, further comprising:

storing, by the computer system, active assignment metadata for the distributed database system, wherein the active assignment metadata is updated throughout the data migration, and is usable to determine when the data migration is complete by comparing the active assignment metadata to the new assignment metadata.

10. The method of claim 9, further comprising:

receiving, by the computer system during the data migration, a second indication of a different data migration;

copying, by the computer system, the active assignment metadata to the current assignment metadata;

merging, by the computer system, the data migration and the different data migration into a merged data migration, wherein the merging includes changing any migration instructions in the data migration that are overwritten by the different data migration;

setting, by the computer system, the new assignment metadata to be a desired configuration specified by the merged data migration; and completing the merged data migration using the newly copied current assignment metadata.

11. A non-transitory computer-readable storage medium storing program instructions capable of being executed by a distributed database system to perform operations comprising:

storing current assignment metadata for the distributed database system that identifies a current mapping of virtual groupings of database extents to corresponding ones of a plurality of physical storage nodes;

storing new assignment metadata for the distributed database system that identifies a new mapping between virtual groupings of database extents to corresponding ones of the plurality of physical storage nodes, the new assignment metadata being generated responsive to an indication of a data migration between the plurality of physical storage nodes;

after the storing of the current and new assignment metadata and during the data migration:

receiving a read request corresponding to a particular database extent that the data migration specifies is to be moved from a first physical storage node to a second physical storage node;

responding to the read request by 1) identifying the first physical storage node using the current assignment metadata and 2) reading data from the first physical storage node;

receiving a write request corresponding to the particular database extent; and responding to the write request by 1) identifying the second physical storage node using the new assignment metadata and 2) writing data to the second physical storage node; and upon the data migration being complete, identifying physical storage nodes accessed by subsequent read and write requests using the new assignment metadata without using the current assignment metadata.

12. The non-transitory computer-readable storage medium of claim 11, wherein identifying the first physical storage node using the current assignment metadata includes:

performing, using an identifier for the particular database extent, a hashing operation that maps the particular database extent to a given virtual grouping; and determining that the given virtual grouping corresponds to the first physical storage node.

13. The non-transitory computer-readable storage medium of claim 12, wherein the storing of the new assignment metadata further comprises:

receiving, from an orchestrator, an indication that the new assignment metadata was generated; and downloading, from durable storage, the new assignment metadata.

14. The non-transitory computer-readable storage medium of claim 11, the operations further comprising:

responding to a different read request by:

identifying, using the current assignment metadata, a third physical storage node for the different read request;

determining, when responding to the different read request, that data requested by the different read request has been updated in a fourth physical storage node identified in the new assignment metadata; and reading the data requested by the different read request from the fourth physical storage node rather than the third physical storage node.

15. The non-transitory computer-readable storage medium of claim 11, wherein the plurality of physical storage nodes are hosted at a given one of a plurality of availability zones for the distributed database system, and wherein the current assignment metadata and the new assignment metadata indicate a mapping for the physical storage nodes within the given availability zone, and the operations further comprise, for a different memory access request that maps to a specified physical storage node in the given availability zone:

determining, in response to the different memory access request, that the specified physical storage node is unavailable; and routing, in response to the determining, the different memory access request to a corresponding physical storage node within a different one of the plurality of availability zones, the corresponding physical storage node being identified using assignment metadata for the different availability zone.

16. The non-transitory computer-readable storage medium of claim 11, wherein the plurality of physical storage nodes are hosted at a given one of a plurality of availability zones for the distributed database system, and wherein:

identifying the first physical storage node using the current assignment metadata is performed using a first hashing operation on the particular database extent; and identifying a particular physical storage node for the particular database extent in a different one of the plurality of availability zones is performed using a second, different hashing operation.

17. A computer system, comprising:

one or more processors;

memory having program instructions stored therein that are executable by the one or more processors to cause the computer system to perform operations including:

storing, by a computer system, current assignment metadata for the computer system that identifies a current mapping of virtual groupings of database extents to corresponding ones of a plurality of physical storage nodes;

storing, by the computer system, new assignment metadata for the computer system that identifies a new mapping between virtual groupings of database extents to corresponding ones of the plurality of physical storage nodes, the new assignment metadata being generated responsive to an indication of a data migration between the plurality of physical storage nodes;

after the storing of the current and new assignment metadata and during the data migration:

receiving a read request corresponding to a particular database extent that the data migration specifies is to be moved from a first physical storage node to a second physical storage node;

responding to the read request by 1) identifying the first physical storage node using the current assignment metadata and 2) reading data from the first physical storage node;

receiving a write request corresponding to the particular database extent; and responding to the write request by 1) identifying the second physical storage node using the new assignment metadata and 2) writing data to the second physical storage node; and upon the data migration being complete, identifying physical storage nodes accessed by subsequent read and write requests using the new assignment metadata without using the current assignment metadata.

18. The computer system of claim 17, wherein identifying the first physical storage node using the current assignment metadata further comprises:

performing, using an identifier for the particular database extent, a hashing operation that maps the particular database extent to a given virtual grouping; and determining that the given virtual grouping corresponds to the first physical storage node.

19. The computer system of claim 17, wherein the operations further comprise:

responding to a different read request by:

identifying, using the current assignment metadata, a third physical storage node for the different read request;

determining, when responding to the different read request, that data requested by the different read request has been updated in a fourth physical storage node identified in the new assignment metadata; and reading the data requested by the different read request from the fourth physical storage node rather than the third physical storage node.

20. The computer system of claim 17, wherein the operations further comprise:

storing active assignment metadata for the computer system, wherein the active assignment metadata is updated throughout the data migration, and is usable to determine when the data migration is complete by comparing the active assignment metadata to the new assignment metadata;

receiving, by the computer system during the data migration, a second indication of a different data migration;

copying, by the computer system, the active assignment metadata to the current assignment metadata;

merging, by the computer system, the data migration and the different data migration into a merged data migration, wherein the merging includes changing any migration instructions in the data migration that are overwritten by the different data migration;

setting, by the computer system, the new assignment metadata to be a desired configuration specified by the merged data migration; and completing the merged data migration using the newly copied current assignment metadata.

* * * * *